(12) United States Patent
Waters

(10) Patent No.: US 11,535,454 B2
(45) Date of Patent: Dec. 27, 2022

(54) CONVEYORS

(71) Applicant: INNOVATIVE MINING SERVICES (AUST) PTY LTD., Perth (AU)

(72) Inventor: Darren Waters, West Perth (AU)

(73) Assignee: INNOVATIVE MINING SERVICES (AUST) PTY LTD., Perth (AU)

( * ) Notice: Subject to any disclaimer, the term of this patent is extended or adjusted under 35 U.S.C. 154(b) by 0 days.

(21) Appl. No.: 17/375,638

(22) Filed: Jul. 14, 2021

(65) Prior Publication Data
US 2022/0063920 A1 Mar. 3, 2022

Related U.S. Application Data

(63) Continuation of application No. PCT/AU2020/050020, filed on Jan. 15, 2020.

(30) Foreign Application Priority Data

Jan. 15, 2019 (AU) .................................. 2019900121

(51) Int. Cl.
 *B65G 15/64* (2006.01)
 *B65G 21/20* (2006.01)
 *B65G 39/16* (2006.01)

(52) U.S. Cl.
 CPC ............. *B65G 15/64* (2013.01); *B65G 21/20* (2013.01); *B65G 39/16* (2013.01);
 (Continued)

(58) Field of Classification Search
 CPC ........ B65G 15/64; B65G 21/20; B65G 39/16; B65G 2203/0283; B65G 2203/04; B65G 2812/02019
 See application file for complete search history.

(56) References Cited

U.S. PATENT DOCUMENTS

| | | | | |
|---|---|---|---|---|
| 1,770,957 A | * | 7/1930 | Veale ..................... | B65G 39/16 474/106 |
| 2,569,419 A | * | 9/1951 | Kendall ................. | B65G 39/16 198/808 |

(Continued)

FOREIGN PATENT DOCUMENTS

| CN | 103204351 B | 7/2013 |
|---|---|---|
| CN | 106743330 A | 5/2017 |

(Continued)

OTHER PUBLICATIONS

International Search Report, PCT/AU2020/050020, dated Feb. 28, 2020, 2 pages.

(Continued)

*Primary Examiner* — Mark A Deuble

(74) *Attorney, Agent, or Firm* — Edell, Shapiro & Finnan, LLC

(57) ABSTRACT

An arrangement to maintain alignment of a moving conveyor belt. The arrangement includes a sensing assembly arranged for sensing a position or movement of a portion or region of the belt, and an actuator assembly having one or more actuator modules operable so as to adjust or modify a position, alignment, or orientation of a portion or region of a support assembly in order to counter and/or correct an alignment of the belt based on, at least in part, the sensed position or movement of the belt.

20 Claims, 22 Drawing Sheets

(52) U.S. Cl.
CPC .. *B65G 2203/0283* (2013.01); *B65G 2203/04* (2013.01); *B65G 2812/02019* (2013.01)

(56) References Cited

U.S. PATENT DOCUMENTS

| | | | | |
|---|---|---|---|---|
| 3,593,841 | A * | 7/1971 | Leow | B65G 39/16 226/23 |
| 8,351,830 | B2 * | 1/2013 | Kudo | G03G 15/6532 399/302 |
| 8,556,068 | B2 * | 10/2013 | DeVries | B65G 39/16 198/806 |
| 9,156,619 | B2 * | 10/2015 | Buschmann | B65G 39/16 |
| 9,346,622 | B2 * | 5/2016 | Kuiper | B65G 39/16 |

FOREIGN PATENT DOCUMENTS

| | | |
|---|---|---|
| CN | 206782726 U | 12/2017 |
| CN | 108516286 A | 9/2018 |
| CN | 108689098 A | 10/2018 |
| EP | 0569973 A1 | 11/1993 |
| JP | 2008127177 A | 6/2008 |
| KR | 20040042134 A | 5/2004 |

OTHER PUBLICATIONS

International Preliminary Report on Patentability, PCT/AU2020/050020, dated Nov. 16, 2020, 21 pages.

\* cited by examiner

CONVEYORS

TECHNICAL FIELD

In one aspect, an arrangement for use in maintaining alignment of a moving conveyor belt is disclosed.

BACKGROUND

Conveyor belts used for the mass transfer of product (such as those used in the mining industry for conveying raw minerals) have a common problem in that the belt has the potential to 'track off' out of alignment with the overall conveyor structure.

Existing mechanical solutions for belt tracking include installing 'tracking frames' at specific intervals along the length of a conveyor belt assembly. A tracking frame is a mechanical device/assembly mat carries the weight of the conveyor belt by means of one or more rollers supported or held by way of a 'reaction arm' (which is supported by the tracking frame). Each reaction arm is fitted with small rollers so as to prevent damage to the edge of the conveyor belt as it moves. A tracking frame is often arranged so as to rotate or pivot at a point that is substantially central of a properly aligned conveyor belt. In use, a tracking frame functions by way of a misaligned (or mis-tracked) belt pushing against/on a roller of a reaction arm.

Conveyor belt tracking is an issue to any business that use conveyor belt systems for the movement of material. If such issues are left unresolved, material can spill from the conveyor belt making the area dangerous and potentially causing significant damage to the conveyor belt itself and/or surrounding structure.

There are many reasons why conveyor belts 'track off', including (non-exhaustively) the following:
- conveyed product is not being fed onto the conveyor centrally;
- worn pulleys/rollers;
- spillage/carry back/build up;
- conveyor structure/pulleys not being square;
- belt splice(s) not properly straight/aligned;
- severe weather conditions, such as for example, rain and wind.

Most of these problems cannot be fixed (safely) during operation (or 'online'), and therefore require the conveying system/machinery to be shut down in order to be rectified.

Most conveyor belt systems have multiple tracking frames on the 'carry' and 'return' sides of the conveyor belt to help address conveyor belt tracking issues. Tracking frames work well to realign the conveyor belt but they are not without their own issues. Tracking frames can become built up with product/spillage, causing them to seize and, consequentially, compromise their effectiveness at tracking the conveyor belt. The small rollers on the reaction arms can become damaged or snap off, and allow the belt to continue to track misaligned. A tracking frame will be activated by the conveyor belt but will change the position of the conveyor upstream of its position and have very little effect on the belt at the position of the frame.

Loading zones and mis-fed product (ie. product being fed onto the conveyor belt) are generally the biggest causes of conveyor belt tracking issues. Most conveyor belt transfer chutes contain training plates that can be moved to change the presentation of product onto the conveyor belt, helping the conveyor belt to run true. These transfer chutes are not always accessible when the conveyor assembly is operational and can require the system to be shut down in order to be adjusted. Conveyor belt transfer chutes also wear thereby changing the trajectory of the product as the wearing progresses. These are normally fixed during a scheduled maintenance shutdown. Transfer chutes also build up with product causing the trajectory of the product to change, thereby causing the conveyor belt below the chute to track off.

A very common practice involves tying a length of rope onto a tracking frame and fixing it off to adjacent support structure to force the conveyor belt toward a corrective direction. This is done while an operator investigates the reason(s) causing the conveyor belt to track off. If the problem is not readily fixable, the rope is loft on until the next scheduled maintenance shut down. To be safe, corrective intervention has to be undertaken/completed 'off-line' as the operator fitting the rope is in close proximity to rotating equipment. Attempts to take such steps white the system is online exposes the operator to significant hazards.

Another common practice for tracking frames subject to build up of product is to manually force/handle the frame to free them up. This should also be attempted off-line to avoid prospective safety hazards.

It is against this background that the embodiments described herein have been developed.

It is to be understood that each document, reference, patent application or patent cited in this text is expressly incorporated herein in their entirety by reference, which means that it should be read and considered by the reader as part of this text. That the document, reference, patent application, or patent cited in this text is not repeated herein is merely for reasons of conciseness.

Furthermore, in this specification, where a literary work, act or item of knowledge (or combinations thereof), is discussed, such reference is not an acknowledgment or admission that any of the information referred to formed part of the common general knowledge as at the priority date of the application. Such information is included only for the purposes of providing context for facilitating an understanding of the inventive concept/principles and the various forms or embodiments in which those inventive.

SUMMARY

According to a first principal aspect, there is provided an arrangement for use with a conveyor belt assembly having one or more support or tracking frame assemblies for supporting a conveyor belt, the arrangement comprising:
- a sensing assembly provided relative a conveyor belt of the conveyor belt assembly, and configured for sensing a position or movement of the conveyor belt and
- an actuator assembly associated with a support assembly and configured operable for adjusting or modifying a position, alignment, or orientation of a portion or region of the support assembly so as to counter and or correct an alignment of the conveyor belt based on, at least in part, said sensed position or movement.

According to a further principal aspect, there is provided an arrangement for use with a conveyor belt assembly having one or more support or tracking frame assemblies for supporting a conveyor belt, the arrangement comprising:
- a sensing assembly provided relative a conveyor belt of the conveyor belt assembly, and configured for sensing a position or movement of the conveyor belt in a direction that is aligned substantially transverse a direction in which the conveyor belt moves, and
- an actuator assembly associated with a support assembly and configured operable for adjusting or modifying a position, alignment, or orientation of a portion or region of the support assembly so as to, based on at least said sensed position or movement:
(i) resist further movement of the conveyor belt in said transverse direction; anchor
(ii) bias the belt to or toward an alignment of the conveyor belt prior to said position or movement being sensed; and/or
(iii) restoring alignment of the belt to one substantially in accordance with general operation of the conveyor belt assembly; and/or
(iv) take no action in respect of the conveyor belt.

According to another principal aspect, there is provided an arrangement for use with a conveyor belt assembly having one or more support or tracking frame assemblies for supporting a conveyor belt, the arrangement comprising:
a sensing assembly provided relative a conveyor belt of the conveyor belt assembly, and configured for sensing a position or movement of the conveyor belt, and
an actuator assembly associated with a support assembly and configured operable for adjusting or modifying a position, alignment, or orientation of a portion or region of the support assembly so that said portion or region engages with a portion or region of the moving conveyor belt for countering and/or correcting an alignment of the conveyor belt based on, at least in part said sensed position or movement.

According to a further principal aspect, there is provided an arrangement for use with a conveyor belt assembly having one or more support or tracking frame assemblies for supporting a conveyor belt, the arrangement comprising:
a sensing assembly provided relative a conveyor belt of the conveyor belt assembly, and configured for sensing a position or movement of the conveyor belt in a direction that is aligned substantially transverse a direction in which the conveyor belt moves, and
an actuator assembly associated with a support assembly and configured operable for adjusting or modifying a position, alignment, or orientation of a portion or region of the support assembly so that said portion or region, based on at least said sensed position or movement, engages with a portion or region of the moving belt for:
(i) resisting further movement of the conveyor belt in said transverse direction; and/or
(ii) biasing the conveyor belt to or toward an alignment of the belt prior to said position or movement boing sensed; and/or
(ill) restoring alignment of the conveyor belt to one substantially in accordance with general operation of the conveyor belt assembly.

The mining industry is one of the biggest users of conveyor belts which utilise tracking frame assemblies or tracking frames. Such conveyor belt systems are used in extreme conditions and tend to incur high costs as a result of equipment downtime and high safety standards. Embodiments of the principles exemplified by the arrangements described herein offer, in at least one respect, a simple/ elegant, convenient, and cost-effective solution to conveyor belt alignment correction which can be readily integrated or retrofitted for operation with pre-existing tracking frame assemblies—which is not currently achievable using existing solutions. Advantageously, embodiments of the arrangements described herein seek to avoid the need to use ropes and manual handling practices to correct conveyor belt alignment, and/or to eliminate the need for equipment isolation to, for example, free a tracking frame having become seized in operation.

Embodiments of the above principal aspects, and those described below, may incorporate any of the following features.

In one embodiment, the support assembly is provided in the term of a tracking frame assembly of the conveyor belt assembly.

In one embodiment, the conveyor belt is a continuously driven belt having, during operation, a 'carry' section and a 'return' section. In operation, the carry section conveys product from a teed zone (where said product is placed on the belt) to a destination zone (where conveyed product is removed from the belt), and the return section returns a portion of the belt to the feed zone. In this manner, the belt operates in a continuous looped arrangement with rollers at ends where the belt transitions from the carry section to the return section, and vice versa.

In one embodiment, an embodiment of the arrangement is configured for operable use with the 'carry' section of the conveyor belt.

In one embodiment, an embodiment of the arrangement is configured for operable use with the 'return' section of the conveyor belt.

In one embodiment, embodiments of the arrangement are configured for operable use with both the 'carry' and 'return' sections of the conveyor belt.

In one embodiment, the support assembly is supported by a support structure configured to support the primary componentry of the conveyor belt assembly. In one embodiment, such support structure comprises two spaced apart substantially support frames arranged in a parallel like relationship along a length that corresponds substantially with the length of the conveyor belt.

In one embodiment, the parallel spaced apart support frames compose one or more truss elements.

In one embodiment, the support assembly (or, for example, tracking frame assembly—or sometimes referred to as a tracker frame assembly) is configured so as to be provided with freedom to rotate or pivot relative to the conveyor belt. In this regard, the support assembly is operably associated with an assembly arranged so as to allow freedom for the support assembly to rotate or pivot. In this regard, the support assembly is configured with associated structure supporting same so that the support assembly is provided with freedom to rotate about an axis that is substantially orthogonal with or to the conveyor belt assembly and substantially central with or to a width of the conveyor bait assembly, such rotational freedom allowing for engagement to occur between the tracking frame assembly (eg. one or more portions thereof) and one or more portions (eg. edge portions) of the conveyor belt during operation.

In one embodiment, the support assembly composes one or more conveyor belt engagement devices/units (such as for example, roller units).

In one embodiment, said region of the support assembly that engages with the region or portion of the moving conveyor belt is a roller configured so as to be in rolling contact with the conveyor belt when moving.

In one embodiment, the support assembly comprises a support member operably associated with the rotating or pivoting assembly (hereinafter, pivot assembly).

In one embodiment, said pivot assembly comprises one or more bearing assemblies.

In one embodiment said pivot assembly is supported by a support structure that spans across or between the spaced apart parallel aligned support frames. In one form, the support structure that spans across or between the spaced apart parallel aligned support frames comprises more than one cross-beam and configured at a central region thereof for supporting the pivot assembly.

In one embodiment, the support member is configured so as to be rotatable about a vertical axis that is substantially aligned with a central axis of the conveyor belt assembly.

In one embodiment, the arrangement comprises one or more actuator assemblies operable individually or in concert by way of said position or movement sensing of the conveyor belt. In one form, said sensing could be undertaken by way of one or more sensing assemblies spaced along the length of the conveyor belt.

In one embodiment, the actuator assembly is electrically operable. In one form the actuator assembly comprises one or more actuator modules (such as for example, a linear actuator).

In one embodiment, the sensing assembly's electrically operable. In one form the sensing assembly comprises one or more sensor modules (such as for example, a proximity or drift switch, or any form of like functioning sensor capable of sensing position or movement of an object).

In one embodiment, the sensing assembly is provided at a location along a length of the conveyor belt. In one embodiment, the sensing assembly comprises one or more sensor modules spaced (uniformly, non-uniformly, or otherwise) along the length of the conveyor belt.

In one embodiment, the sensing assembly is spaced from the actuator assembly.

In one embodiment, the sensing assembly is spaced ahead (relative to the moving direction of the conveyor belt) of the actuator assembly.

In one embodiment, the actuator assembly is spaced behind (relative to the moving direction of the conveyor belt) of the sensing assembly.

By way of brief explanation, and as foreshadowed earlier, a standard support assembly (or tracking frame) senses conveyor belt drift by means of reaction arms fitted to the tracking frame. These reaction arms change or vary the angle of the support assembly (or tracking frame) to redirect the conveyor belt back towards a central axis (such as for example, a central axis of the conveyor belt assembly). The conveyor belt will begin to move towards the center of the tracking frame but will not reach center until some meters upstream of the tracking frame adjustment. Thus, being able to sense belt drift by means of sensing modules (such as for example, proximity or drift switches) means that the sensing modules can be placed up-stream of the tracking frame. This can be advantageous if, for example, mere is a loading zone directly after a tracking frame, the sensing modules (eg. drift switches) can pick up or identify conveyor belt misalignment which may be caused by the loading zone and make the appropriate corrections to the support assembly (eg. tracking frame) before the loading zone to counteract the conveyor belt drift caused by the loading zone.

However, the sensing assembly could be spaced downstream of the actuator assembly if it were considered to be appropriate for circumstances at hand. Ultimately, any number of sensing assemblies could be placed at any respective location along the length of the conveyor belt in order to improve or optimize the management (adjustment/correction action) of the alignment of the conveyor belt during operation.

Embodiments of the arrangement may be configured so as to operate on either or both of the 'carry' and 'return' sides of the conveyor belt.

In one embodiment, the support assembly comprises one or more conveyor belt engaging devices or units. In one embodiment, the or each conveyor belt engaging device/units comprises rollers which provide rolling support to the conveyor belt as it moves.

In one embodiment, the or each conveyor belt engaging devices or units are supported by the support member by way of engineered bracket or mounting assemblies (as appropriate).

In one embodiment, the support member supports first, second, and third rollers, whereby the second roller is supported intermediate of the first and third rollers. In one embodiment, the second roller is supported by the support member at a region thereof that is substantially aligned with the vertical axis about with the Support member rotates or pivots.

In one embodiment, each of the first, second, and third rollers are supported on the support member by way of respective bracket assemblies. In one embodiment, rotational motion of said rollers is provided by way of respective axle members and/or bearings assemblies supported by the respective brackets.

In one embodiment, support of the first, second, third rollers is appropriate such that any are capable of engaging with respective portions/regions of the belt during operation as may be required for adjusting (such as for example, by way of steering by way of rotational/pivoting movement of the support assembly) the alignment of the belt.

In one embodiment, the support member supports one or more edge rollers. In one embodiment, the or each edge roller is supported by the support member at or near an end or side of the support member so that the or each edge roller can be spaced from respective edge portions or regions of the conveyor belt.

In one embodiment, the support assembly comprises first and second edge rollers, each supported so as to be located (or locatable) substantially adjacent a respective edge portion or region of the conveyor belt.

In one embodiment, the first and second edge rollers and each supported so as to be spaced from respective edge portions or regions of the conveyor belt.

In one embodiment, each of the first and second edge rollers are supported on the support member by way of respective bracket assemblies.

In one embodiment, rotational motion of the first, second edge rollers is provided by way of respective axle members and/or bearings assemblies supported by the respective brackets.

In one embodiment, support of the first, second edge rollers is appropriate such that either are capable of engaging with respective portions/regions of the belt during operation as may be required for adjusting (such as for example, by way of steering by way of rotational/pivoting movement of the support assembly) the alignment of the belt.

In one embodiment, the sensing assembly is spaced from a portion or region of an edge of the conveyor belt.

In one embodiment the sensing assembly comprises one or more sensor modules.

In one embodiment, the or each sensor module is/are arranged on a respective side of the conveyor belt, each sensor module configured for sensing a position or movement of a portion or region of the conveyor belt in said transverse direction.

In one embodiment, the or each sensor module is configured so as to sense a current (such as for example, real-time condition) position or movement of a portion or region of the conveyor belt in said transverse direction.

In one embodiment, the or each sensor module comprises a proximity, limit, or "drift" sensor/switch.

In one embodiment, the or each sensor modules comprises a misalignment switch. In one embodiment, the or each alignment switch is provided in the form of a Safe-T-Drift® Heavy Duty Belt Misalignment Switch.

In one embodiment, the or each sensor modules are supported (for example, on suitable structure associated with the conveyor belt assembly) by way of respective support or bracket assemblies, configured so as to support the sensor modules at the desired position/location relative to respective skies or edges or the conveyor belt and/or relative to one or more components (such as, for example, an actuator module) actuator assembly. In one form the support or bracket assemblies comprises one or more elongate tubes engineered and assembled as required.

In one embodiment, the sensor modules comprise one or more image capture devices (such as for example, cameras) arranged so as to capture/record images of the belt. In one form, static or moving images may be captured. In one arrangement, one or more of the static or video images may be processed (by way of, for example, image processing techniques) so as to determine a position of the belt, and/or movement of the belt.

The skilled reader will readily appreciate other types of position, proximity, limit, image, movement sensor modules, or sensing arrangements, that may be operable with the principles described herein.

In one embodiment, a sensing assembly is provided at or near opposite sides of the conveyor belt at or near corresponding locations.

In one embodiment, the sensing assembly comprises a sensor module provided at or near opposite sides of the conveyor belt at or near corresponding locations.

In one embodiment the sensing assembly of the arrangement comprises a pair of sensor modules, each placed on opposite sides of the conveyor belt.

In one embodiment, a first sensor module is associated (by way of, for example, an appropriate connecting, mounting, or clamping arrangement) at or near a first end of the support assembly, and a second sensor module is associated (by way of, for example, an appropriate connecting, mounting, or clamping arrangement) at or near a second end of the support assembly, whereby the first and second sensor modules are provided at or near a first side of the support assembly. In one embodiment, the first side of the support assembly is, in the context of application of the arrangement described herein, uppermost of the support assembly and/or proximal the conveyor belt. In one embodiment, the first side of the support assembly is distal of its support member, whereby the support member is substantially lowermost of the support assembly.

In one embodiment, the first and second sensor modules are supported so as to be substantially symmetric about a central axis of the conveyor best which runs in the direction of movement of the belt. In one embodiment the central axis of the conveyor belt is substantially aligned with the central axis of the conveyor belt assembly when the conveyor belt is in a desired alignment. In this manner, the distance between opposite edges of the belt and respective first, second sensor modules, is substantially the same. In one embodiment, said distance either side of the opposite edges of the conveyor belt define respective limits which correspond with an acceptable tolerance of transverse movement of the conveyor belt. Such tolerance can be subject to change depending on circumstances, and, as such, the limits can also be redefined (thereby varying the distance).

In one embodiment, the first and second sensor modules may be configured so that their position relative to the conveyor belt can be varied. Such variation could be by way of a manual manipulation or could be conducted remotely. For example, the first and/or second sensor modules could be supported by, for example, a servo motor arrangement configured so that the distance between the first, second sensor module and a respective edge portion/region of the conveyor belt can be varied or variable as might be required.

In one embodiment, the actuator assembly comprises one or more actuator modules.

In one embodiment, the or each actuator modules are supported (for example, on portions of the support assembly) by way of respective support or bracket assemblies, configured so as to support the actuator modules at the desired position/location. In one form the support or bracket assemblies comprises one or more elongate tubes engineered (which could be square, circular, or otherwise in cross-section) and assembled as required.

In one embodiment, the or each actuator module is supported by the support structure supporting the support assembly (or tracker frame assembly).

In one embodiment, the or each sensor modules are provided (for example, supported by the support assembly or tracking frame) ahead (relative to the direction of the conveyor belt) of the actuator assembly.

In one embodiment, the or each sensor modules are provided (for example, supported by the support assembly or tracking frame) ahead (relative to the direction of the conveyor belt) of the or each actuator modules.

In one embodiment, the or each linear actuator modules is/are provided (for example, supported by the support assembly or tracking frame) downstream (relative to the direction of the conveyor belt) of the or each sensor modules.

In one embodiment, the actuator assembly is provided (for example, supported by the support assembly or tracking frame) downstream (relative to the direction of the conveyor belt) of the or each sensor modules.

In one embodiment, the or each actuator modules are operably associated with the support assembly and arranged so as to move a portion or region of the support assembly into engagement (such as for example, moving/bringing one of the rollers supported by the support assembly into rolling contact/engagement) with a portion or region of the conveyor belt (for example, an edge portion/region of the conveyor belt). In other embodiments, the reverse arrangement is provided for.

In one embodiment, the or each actuator module(s) is/are associated with the support assembly and arranged so as to move the support assembly so that the first or third rollers (whichever is relevant) of the support assembly are moved into engagement with a portion or region of the conveyor belt (for example, an edge portion/region of the conveyor belt that is adjacent or proximal the relevant first/third roller).

In one embodiment, the arrangement comprises a controller module configured in operable association with the or each sensor module and the or each actuator module, the controller module configured operable for facilitating operation of the or each actuator module so as to adjust or modify a position, alignment, or orientation of a portion or region of the support assembly.

In one embodiment, the adjusting or modifying of a position, alignment, or orientation of a portion or region of the support assembly is for at least the purpose of maintaining, or seeking to maintain, correcting, or restoring an alignment of the conveyor belt so that it accords substantially with a desired alignment condition of the conveyor belt.

In one embodiment, the seeking to counter/correct any misalignment of the moving conveyor belt is based on, at least in part, the sensed position or movement of the portion or region of the conveyor belt, whether the sensing is by way of the user (such as for example, a manual based mode of operation) or otherwise (such as for example, a substantially automatic or autonomous mode of operation).

In one embodiment, the or each actuator module is/are arranged on a respective side or edge portion/region of the conveyor belt.

In one embodiment, managing the alignment of the moving conveyor belt is by way of using sensed information obtained by the or each sensor modules of the alignment of the conveyor belt to inform a response from the or each actuator modules. In this manner, the desired alignment of the moving conveyor belt can be sought to be maintained in accordance within acceptable limits.

In one embodiment the actuator assembly of the arrangement comprises a pair of actuator modules, each placed on opposite sides of the support assembly.

In one embodiment, a first actuator module is associated (by way of, for example, an appropriate connecting, mounting, or clamping arrangement) at or near a first end of the support member of the support assembly, and a second actuator sensor module is associated (by way of, for example, an appropriate connecting, mounting, or clamping arrangement) at or near a second end of the support member.

In one embodiment, the first and second actuator modules are supported so as to be substantially symmetric about the central axis of the conveyor belt assembly.

In one embodiment, the first, second actuator modules each comprise a linear actuator modulo. In one embodiment, each linear actuator module is a provided in the form of a SKF 500N CAHB-10 Electric Linear Actuator powered by a 24-volt direct current source, and having a 200 mm stroke length.

In one embodiment, the first and second actuator modules each comprise a rod element operable so as to be extendable outward from the module to or toward an extended condition/position, and operable to or toward a retracted condition/position. In one embodiment, the rod element is provided in the form of a screw element.

In one embodiment, the arrangement further comprises a reaction or stop assembly comprising one or more reaction or stop elements (hereinafter, reaction element) associated with respective actuator modules so that the rod/screw of each respective actuator module may engage with the reaction element as required (for example, during extension of the rod/screw).

In one embodiment, the or each reaction elements provide a portion or region (such as for example, a planar portion or region thereof) against which an actuator module can urge against (such as for example, byway of the actuator module's extendable rod or screw element).

In one embodiment, the or each reaction element is stationary relative to the support member supporting the respective linear actuator module(s) (said support member being conferred freedom to rotate or pivot). In one embodiment, the or each reaction element is supported by way of structure configured to support the conveyor belt assembly.

In one embodiment, each linear actuator module and respective reaction element are arranged so that extension of the actuator module's rod/screw engages the respective reaction element causing rotational movement of the support assembly about its rotation or pivot axis. In this manner, rotation or pivoting of the support assembly brings either the first or third roller (whichever is appropriate) into engagement/contact (for example, via rolling engagement/contact) with a portion or region of the relevant adjacent edge portion/region of the conveyor belt.

In one form, a single reaction element is associated with a respective linear actuator module.

In one embodiment, each reaction element comprises a substantially planar region which is engaged by a rod or screw element of a corresponding linear actuator module. In one embodiment, the or each reaction element is mounted, connected, or damped to a region of structure associated (for example, supporting) with the conveyor belt assembly, or could be mounted, connected, or damped to a region of the support assembly when the actuator module is mounted, connected, or damped to a portion/region of the structure associated with the conveyor belt assembly.

In one embodiment, the or each reaction elements is a plate element.

In one embodiment, the structure/frame (for example, the pair of parallel spaced apart support frames) associated with the conveyor belt assembly also supports the pivot assembly that supports the support assembly or tracking frame.

In one embodiment, the actuator assembly and the reaction element are connectable between the support assembly and support structure supporting the conveyor belt assembly.

In one embodiment, the actuator assembly is connectable to a region of the support assembly. In one embodiment, said region of live support assembly that the actuator assembly is connectable to is spaced from the region of the support assembly the sensor assembly is connectable to.

In one embodiment, the reaction element is connectable to a region of the support structure supporting the conveyor belt assembly.

In one embodiment, the arrangement comprises a restoring assembly configured so as to restore the support assembly to an initial condition following any modification or adjustment of its position by way of the operation of the actuator assembly and the reaction element. In one embodiment, said restoring assembly comprises a biasing mechanism configured so as to counter, when appropriate, movement of the support assembly caused by operation of the actuator assembly and the reaction element.

Accordingly, operation of the arrangement involves a sensing of a position or movement of a portion or region of the moving conveyor belt, then based on at least the sensed position or movement of the conveyor belt, initiating or not initiating an adjustment or modification to a position of a portion or region of the support assembly (for example, the position of the first or third rollers supported by support assembly, as the case may be) to engage a portion or region of the conveyor belt so as to avoid continuance of any misalignment of the conveyor belt as it moves.

In one embodiment, each end of the support assembly (which corresponds with opposite edges of the conveyor belt) is associated with a respective sensor module and linear actuator module, whereby the sensor module is positioned so as to sense a position or movement of a portion or region (such as for example, an edge portion) of the conveyor belt as it moves. In this manner, opposite edges of the conveyor belt can be monitored for position or movement that may reach a respective predetermined limit. If a sensor module senses a position or movement of an edge of the conveyor belt (that which is being monitored) that reaches or extends beyond the respective predetermined limit, the arrangement responds by operating the corresponding linear actuator module so that its rod/screw element extends so as to engage/contact (for example, the planar region of) the corresponding reaction element. This contact/engagement serves to rotate or pivot the support assembly away from the relevant reaction element (that is engaged by the respective rod/screw element) thereby bringing the corresponding roller (that which is on the same side of the conveyor belt as the operational linear actuator) into engagement with an adjacent (relative to the roller) edge portion/region of the conveyor belt. This (rolling) contact engagement serves to bias or encourage the conveyor belt to track back toward proper alignment. Further extension of the rod/screw element of the linear actuator module serves to increase the magnitude of the rotation or pivot of the support assembly, thereby increasing the pressure of the corresponding roller on the respective edge (portion/region) of the conveyor belt. In view of the latter, with a sensor module and linear actuator module provided symmetric about the conveyor belt, any misalignment occurring on either side of the conveyor belt can be addressed.

Thus, the interaction between the extendable/retractable rod screw elements of the respective linear actuators and the relevant reaction element serves to steer the support assembly so as to counter any detected misalignment of the belt (by way of the engagement between the relevant roller and an edge portion/region of the belt).

As noted, and for the avoidance of any doubt, the relative configuration of the reaction elements and the corresponding linear actuators could be changed, so as to operate in a 'reverse' manner. For example, the reaction elements and the corresponding linear could be simply substituted. In this regard, the linear actuator modules could be supported by structure configured to support the conveyor belt assembly and held stationery relative to the support assembly, and the reaction elements supported instead by the support assembly (tracker/tracking frame assembly). In this manner, the same relative rotation or pivoting movement of the support assembly could be achieved by way of the same interaction between the linear actuator modules and their respective reaction elements. Accordingly, the interaction between the rod/screw elements of the linear actuator modules, if their relative positions were reversed, would continue to serve to steer the support assembly so as to counter any detected misalignment of the belt. Thus, the skilled reader will appreciate that such an embodiment is well within the scope of the principles described herein.

In one embodiment, the or each sensor modules and actuator modules are electric and powered by way of any electrical power source provided to the arrangement.

In one embodiment, the or each sensor modules and actuator modules are electric and powered by way of the power source providing power to the conveyor belt assembly in this context, electrical power may be sourced from an electrical harness associated with the conveyor belt, which could be providing, for example, 24-volt direct current supply.

In one embodiment, the controller module s configured so as to operate in a first mode of operation. In one form, the first mode of operation corresponds to a manual mode of operation in which a human user or operator is able to operate the or each actuator module. In one sense, such a mode of operation could be seen as (or operated as) a 'calibration' mode used to setup and define the proper operational alignment of the conveyor belt.

The controller module may be operable with a module that allows for manual operation of the or each actuator modules. In this manner, the controller module may provide manual override capability.

In one embodiment, the controller module is configured so as to operate in a second mode of operation. In one form, the second mode of operation corresponds to an automatic mode of operation in which the controller module is configured so as to operate the or each actuator module in accordance with a set of instructions (for example, computer code or firmware). When in the second mode of operation, the controller module may be configured operable so as to manage or facilitate any of the following in a substantially autonomous manner:

(i) resisting further movement of the belt in said transverse direction; and/or
 (ii) biasing the belt to or toward an alignment of the belt prior to said position or movement being sensed; and/or
 (iii) restoring alignment of the belt to one substantially in accordance with general operation of the conveyor assembly; and/or
 (iv) taking no action in respect of the belt.

In one embodiment, when in the second mode of operation, the controller module is configured operable so as to manage or facilitate any of the above listed functions in a substantially autonomous manner based on, at least in part, the sensed position or movement of the conveyor belt.

In one embodiment, when in the first (or manual) mode of operation, the controller module is configured so as to allow the above to be undertaken by a user via an interface.

In one form, the controller module is configured operable with an interface providing one or more controls (such as for example, a key switch, a push button etc). In this manner, the interface can be used (by, for example, a user) to interface with the controller module, for example, initiating modes of operation, and/or operating one or more actuator modules directly.

The interface could be permanently located on the structure supporting the support assembly, or could be portable (for example, when embodiment in the form of a portable electronic device).

In one embodiment, the interface may comprise one or indicator modules provided therewith (or thereon) that correspond with an operation so as to indicate the undertaking (or prospective undertaking) of that operation. For example, the or each indicator modules could comprise any of the following: LED lights, audible alarm, etc.

In one embodiment, the interface may comprise any of the following: touch screen display, portable device, smartphone, or tablet computer, the displays of which could provide (by way of software/hardware implementation) one or more controls for interfacing with the controller module; remote desktop, computer network, etc.

In one embodiment, embodiments of the arrangement described herein are configured so drat the arrangement can be retrofitted to an existing tracking frame of a conveyor belt assembly. In such embodiments, the sensor modules, actuator modules, and or reaction elements, and or respective mounting, connecting, clamping arrangements, are installable (in a releasable manner or otherwise, ie. temporary or permanent) on the tracking frame or relative to the relevant tracking frame in the appropriate locations as required.

In one embodiment, the support assembly may be configured for use with the 'carry' section of the conveyor belt. In one embodiment, embodiments of the above described support assembly are arranged so as to be operable with the 'carry' section of the conveyor belt.

In another embodiment, the support assembly may be configured for use with the 'return' section of the conveyor belt.

In one embodiment, the positions of the actuator assembly mid the reaction element are, in substance, reversed, in that the actuator assembly is connectable to a region of the support structure supporting the conveyor belt assembly, and the reaction element is connectable to a portion or region of a support assembly (for example, a portion or region of the support assembly where the actuator assembly was positioned in the previous embodiment). In such configuration, operation of the arrangement is the same in that actuator assembly by way of its interaction with the corresponding reaction element seeks to adjust or modify the position, alignment, or orientation of the supporting assembly so as to counter any misalignment, or operate to maintain a desired alignment condition of the conveyor belt. In one embodiment, embodiments of such a configuration (and operation) are arranged so as to be operable with the 'return' section of the conveyor belt.

In one embodiment, the support assembly for use with a return section of the belt (hereinafter, return support assembly) comprises a first bracket assembly having a base member and uptight members provided/connected at or near opposite ends of the base member. In one form, the upright members are each configured so as to rotatably support a belt engaging device/unit, such as for example, roller, by way of, for example, a suitable axle assembly in substantially the same manner as described above.

In one embodiment, each of the upright members support via suitable structure respective edge rollers out from the first bracket assembly. In one form, said suitable structure for supporting respective edge rollers are engineered/assembled so that each of the edge rollers are spaced (at a distal region of the respective tube section) from respective edges of the 'return' section of the belt. In another form, said suitable structure also support reaction respective reaction elements (which, for example, can be urged against by way of the rod/screw elements of respective actuator modules supported by structure supporting the conveyor belt assembly.

In one embodiment, the first bracket assembly of the return support assembly is rotatably or pivotably supported by a further bracket assembly which spans across the two parallel frame assemblies. The further bracket assembly also comprises a base and upright members at or near opposite ends. In one arrangement, the further bracket assembly is engineered having a shape and form in keeping with that of the first bracket assembly, but sized larger so that the first bracket assembly can rotate/pivot within the second bracket assembly without undue interference. The first bracket assembly may be rotatably or pivotably supported by further bracket assembly by way of a bearing assembly so that the first bracket assembly can pivot relative to (and within the structure of) the further bracket assembly about a substantially vertically aligned axis.

In one embodiment, upright members of the further bracket assembly each support respective ball screw type linear actuators by way of suitable supporting structure.

In one embodiment, the sensing assembly is spaced downstream from the actuator assembly. In some embodiments, the sensing assembly may be spaced upstream from the actuator assembly. In many instances, the relative configuration of the sensing assembly and the actuator assembly with regard to the direction of movement of the belt will be influenced, at least in part, by the circumstances at hand.

According to a further principal aspect, there is provided a method for managing, at least in part, alignment of a moving conveyor belt, the method composing:

sensing a position or movement of a portion or region of the moving conveyor belt, based on at least the sensed position or movement of the moving conveyor belt, initiating or not initiating an adjustment or modification to a position, alignment, or orientation of a portion or region of a support assembly as it supports the moving conveyor belt to assist, at least in part, countering and/or correcting an alignment of the conveyor belt.

According to another principal aspect, there is provided a method for installing or associating any embodiment of an arrangement described herein for operable use with a portion (such as for example, a support assembly or tracking frame) of a conveyor belt assembly or system.

According to a further principal aspect, there is provided a system for use in managing, at least in part, an aspect of the operation of one or more conveyor belt assemblies each having one or more support or tracking frame assemblies supporting a conveyor belt of the respective conveyor belt assembly, the system comprising:

a processor module, a sensing assembly associated with a respective conveyor belt assembly and configured operable for sensing a position or movement of a portion or region of a conveyor belt of the respective conveyor belt assembly.

an actuator assembly associated with a support or tracking frame assembly of each conveyor belt assembly subject to said sensing, and a controller module configured in operable association with the sensing and actuator assemblies, and operable for facilitating operation of the respective actuator assembly for adjusting or modifying a position, alignment, or orientation of a portion or region of the relevant support or tracking frame assembly so as to counter and/or correct an alignment of the relevant conveyor belt based on, at least in part, the sensed position or movement of the relevant conveyor belt.

the processor module and controller module arranged in operable association with the other, the processor module configured operable for managing the alignment of the or each respective conveyor belt based on, at least in part, the sensed position/movement of the relevant conveyor belt.

In one embodiment, said aspect of the operation of the or each conveyor belt assemblies relates to the alignment of a conveyer belt of one or more of the conveyor belts so managed.

In one embodiment, the processor module is remote of the or each conveyor belt assembly.

In one embodiment, the processor module and the or each control module are configured in such a manner allowing bi-directional communication.

In one embodiment, the processor module may be configured so as to communicate instructions to the relevant controller module.

In one embodiment, the processor module is connected to a network.

In one embodiment, the processor module may be operable across or by way of the network.

In one embodiment, information received by the processor module from the or each controller module is used to initiate an alarm or warning indication.

In one embodiment, the processor module is configured for the purposes of monitoring operation of the relevant controller module.

In one embodiment, the processor module is configured for the purposes of operating the or each actuator assemblies by way of communication with respective controller modules.

In one embodiment, the processor module is configured for the purposes of receiving signals regarding the or each sensor modules by way of each respective control module.

In one embodiment, operational management of the or each conveyor belt assembles is remotely undertaken.

In one embodiment, the sensing and/or actuator assemblies are substantially those as described herein.

According to another principal aspect, there is provided a system for use in managing, at least in part, an aspect of the operation of one or more conveyor belt assemblies each having one or more support or tracking frame assemblies supporting a conveyor belt of the respective conveyor belt assembly, the system comprising:
- a processor module,
- any embodiment of an arrangement composing:
  - a sensing assembly associated with a respective conveyor belt assembly and configured operable for sensing a position or movement of a portion or region of a conveyor belt of the respective conveyor belt assembly, and
  - an actuator assembly associated with a support or tracking frame assembly of each conveyor belt assembly subject to said sensing.
- the processor module configured in operable association with the sensing assembly and the actuator assembly of the or each respective arrangement for facilitating operation of the respective actuator assembly for adjusting or modifying a position, alignment, or orientation of a portion or region of the relevant support or tracking assembly so as to counter and/or correct an alignment of the relevant conveyor belt based on, at least in part, the sensed position/movement of toe relevant conveyor belt.

According to a further principal aspect, there is provided a system for use in managing, at least in part, an aspect of the operation of one or more conveyor belt assembles each having one or more support or tracking frame assemblies supporting a conveyor belt of the respective conveyor belt assembly, the system comprising:
- a processor module,
- any embodiment of an arrangement as described herein associated with at least one support or tracking frame assembly of a conveyor belt assembly,
- the processor module configured in operable association with the sensing assembly and the actuator assembly of the or each respective arrangement for facilitating operation of the respective actuator assembly for adjusting or modifying a position, alignment, or orientation of a portion or region of the relevant support or tracking assembly so as to counter and/or correct an alignment of the relevant conveyor belt based on, at least in part, the sensed position/movement of the relevant conveyor belt.

According to another principal aspect, there is provided a system for use in managing, at least in part, an aspect of the operation of more than one conveyor belt assemblies each having a conveyor belt, the system comprising:
- a processor module,
- one or more of the conveyor belt assemblies associated with one or more embodiments of an arrangement as described herein, each arrangement composing a controller module arranged in operable association with toe sensing assembly and the actuator assembly of each respective arrangement,
- the processor module configured in operable association with the or each controller module for managing the alignment of a respective conveyor belt based on, at least in part, the sensed position/movement of toe relevant conveyor belt.

In one form, the processor module of the above principal aspects may be part of or operable with a wider/broader or overarching network. In one embodiment, for example, the network can be a computer network comprising a number of computer systems and other computing hardware that are linked together through communication channels to facilitate communication and resource sharing among a wide range of users and/or connected devices, systems, and various hardware. Such networks may comprise any one or more of the following (connected or otherwise): local Area Networks (LAN). Personal Area Networks (PAN), Home Area Networks (HAN), Wide Area Networks (WAN), Campus Networks, Metropolitan Area Networks (MAN), Enterprise Private Networks, Internetworks, Backbone Networks (BBN), Global Area Networks (GAN), the Internet, The Internet of Thing (IoT) and variations.

According to further aspects, embodiments of the arrangements described herein may be exemplified in the form of a system, support assembly, support frame, tracking frame, for use with a conveyor belt assembly. In further aspects, arrangements described herein may be exemplified in form of a conveyor belt assembly or a system of more than one conveyor belt assemblies (operable via, for example, a networked arrangement) which each comprise one or more embodiments of the arrangement described herein.

According to a further principal aspect, there is provided a kit of parts composing any combination of the features described herein. For example, commercial forms of the embodiments of the arrangement described herein may include kits that comprise the relevant components allowing forms of the arrangement described herein to be installed on existing support assemblies and tracking frames. The skilled reader would appreciate that such kits could take many different forms, providing different combinations of components/features, depending on operator/user needs. In this regard, some forms of such kits may not compose certain components if such components can be sourced (by the purchaser), for example, from alternate sources. Accordingly, the scope of how such kits could be composed could differ depending on an operator/user's needs.

According to a further principal aspect, there is provided an arrangement or system for use with a tracking frame assembly for maintaining alignment of a conveyor belt of a conveyor belt assembly supported by a support structure, the arrangement comprising:
- a sensing assembly connectable with a region of the support structure so as to be spaced from a portion or region of an edge of the conveyor belt, the sensing assembly configured operable for sensing a position or movement of the conveyor belt during operation, and
- an actuator assembly provided between the tracking frame assembly and the support structure, the actuator assembly configured operable for selective urging against a slop assembly so as to adjust or modify a position, alignment, or orientation of a portion or region of the tracking frame assembly for countering and/or correcting an alignment of the conveyor belt based on, at least in part, said sensed position or movement of the conveyor belt.

In one embodiment, the actuator assembly is electrically operable. In one form the actuator assembly comprises one or more actuator modules (such as for example, a linear actuator).

In one embodiment, the sensing assembly is electrically operable. In one form the sensing assembly comprises one or more sensor modules (such as for example, a proximity or drift switch, or any form of like functioning sensor capable of sensing position or movement of an object).

In one embodiment, the actuator assembly and stop are configured operable for adjusting or modifying a position, alignment, or orientation of a portion or region of the tracking frame assembly so that a portion or region thereof engages with a portion or region of the moving conveyor belt for countering and/or correcting an alignment of the conveyor belt based on, at least in part, said sensed position or movement.

In one embodiment, the tracking frame assembly comprises one or more conveyor belt engagement devices/units (such as for example, roller units).

In one embodiment, said region of the tracing frame assembly that engages with the region or portion of the moving conveyor belt is a roller configured so as to be in rolling contact with the conveyor belt when moving.

In one embodiment, the actuator assembly and the stop are connectable between the tracking frame assembly and support structure supporting the conveyor belt assembly.

In one embodiment, the actuator assembly is connectable to a region of the tracking frame assembly. In one embodiment, said region of the tracking frame assembly that the actuator assembly is connectable to is spaced from the region of the tracking frame assembly the ominous assembly is connectable to.

In one embodiment, the stop is connectable to a region of the support structure supporting the conveyor belt assembly.

Thus, operation of the actuator assembly by way of its interaction with the corresponding stop seeks to counter the misalignment, or operate to maintain a desired alignment condition of the conveyor belt.

In one embodiment, the positions of the actuator assembly and the step are reversed as compared to the embodiment described above, in that the actuator assembly is connectable to a region of the support structure supporting the conveyor belt assembly, and the slop is connectable to a region of the tracking frame assembly (for example, the region of the tracking where the actuator was positioned in the previous embodiment). Thus, in such configuration, operation of the actuator assembly by way of its interaction with the corresponding stop seeks to counter any misalignment, or operate to maintain a desired alignment condition of the conveyor belt.

In one embodiment, the sensing assembly senses the position or movement of the portion or region of the edge of the conveyor belt being monitored (by said sensor assembly).

In one embodiment, the sensing assembly is one as described herein.

In one embodiment, the actuator assembly is one as described herein.

In one embodiment, the arrangement comprises a restoring assembly configured so as to restore the tracking frame assembly to an initial condition following any modification or adjustment of its position by way of the operation of the actuator assembly and the stop. In one embodiment, said restoring assembly comprises a biasing mechanism configured so as to counter, when appropriate, movement of the tracking frame assembly caused by operation of the actuator assembly and the stop.

In one embodiment, said sensing assembly, said actuator assembly, and said stop are provided at or near one side or end of the tracking frame assembly, and a further sensing assembly, a further actuator assembly, and a further stop are provided at or near the alternate side of the tracking frame assembly. In one embodiment, the position of said sensing assembly, said actuator assembly, and said stops are arranged so as to be substantially symmetric relative to the conveyor belt. In one form, the position of said sensing assembly, said actuator assembly, and said stops are arranged so as to be substantially symmetric relative a central axis of live conveyor belt when in a desired alignment condition.

In one embodiment, the configuration of the arrangement when connected to or operable with the tracking frame assembly is substantially symmetric.

In one embodiment, the or each sensing assembly, the or each actuator assembly, the or each stop, and/or one or more restoring assemblies are connectable to respective supporting structure by way of suitable fastening, clamping, mounting or like assemblies.

According to another principal aspect, there is provided an arrangement for use with a tracking frame assembly for maintaining alignment of a conveyor belt of a conveyor belt assembly supported by a support structure, the arrangement comprising:

a sensing assembly connectable with a region of the support structure so as to be spaced from a portion or region of an edge of the conveyor belt, the sensing assembly configured operable for sensing a position or movement of the conveyor belt during operation, and an actuator assembly arranged operate between the tracking frame assembly and the support structure, the actuator assembly configured operable for selective urging against a stop or reaction assembly so as to modify a position, alignment, or orientation of a portion or region of the tracking frame assembly for correcting an alignment of the conveyor belt based on, at least in part, said sensed position or movement of the conveyor belt.

In one embodiment, the tracking frame assembly is configured with the support structure so as to be provided with freedom to rotate or pivot about an axis that it substantially orthogonal to the conveyor belt assembly and substantially central to a width of the conveyor belt assembly, the rotation or pivoting of the tracking frame assembly causing engagement of the tracking frame assembly with the moving conveyor belt for countering or correcting its alignment.

In one embodiment, the actuator and atop assemblies are configured operable for adjusting or modifying a position, alignment, or orientation of the tracking frame assembly so that one or more rollers supported by the tracking frame assembly engage with a portion or region at or near an edge of the moving conveyor belt for steering of the tracking frame assembly in the countering or correcting an alignment of the conveyor belt based on, at least in part, said sensed position or movement of the conveyor belt.

In one embodiment, the sensing assembly comprises a pair of sensor modules, each sensor module supported by the support structure so as to be spaced from respective edges of the conveyor belt in a substantially symmetric manner about the conveyor belt assembly.

In one embodiment, the actuator assembly comprises first and second actuator modules connectable with either of the tracking frame assembly or the support structure, each first, second actuator module supported in a substantially symmetric manner about the tracking frame assembly or the support structure, whichever is relevant.

In one embodiment, the stop assembly comprises first and second reaction elements connectable with either of the tracking frame assembly or the support structure, each reaction element supported in a substantially symmetric manner about the tracking frame assembly or the support structure, whichever is relevant.

In one embodiment, the first and second reaction elements are arranged in proximity with the first, second actuator modules respectively for allowing selective urging there against by respective first, second actuator modules for selective steering of the tracking frame assembly in the adjustment of the alignment of the conveyor belt.

In one embodiment, the first and second reaction elements are connected with respective regions of the support structure and the first, second actuator modules are connected with respective regions of the tracking frame assembly.

In one embodiment the first and second reaction elements are retrofitted with respective regions of the support structure and the first, second actuator modules are retrofitted with respective regions of the tracking frame assembly.

In one embodiment, the first and second reaction elements are connectable with respective regions of the tracking frame assembly, and the first, second actuator modules are connected with respective regions of the support structure.

In one embodiment, the first and second reaction elements are retrofitted with respective regions of the tracking frame assembly, and the first, second actuator modules are retrofitted with respective regions of the support structure.

In one embodiment, the arrangement is configured operable with either a 'carry' section of the conveyor belt or a 'return' section of the conveyor belt.

In one embodiment, the sensing assembly is spaced from the actuator assembly along a length of the conveyor belt.

In one embodiment, the sensing assembly is spaced either upstream or downstream from the actuator assembly relative to a running direction of the conveyor belt.

In one embodiment, one or both of the pair of sensor modules comprise any of a proximity sensor or switch, a limit sensor or switch, a drift sensor or switch.

In one embodiment, each of the first and second actuator modules comprise a linear actuator having a rod or screw element operable between a retracted condition or position and an extended condition or position for the selective urging against the stop assembly.

In one embodiment, the arrangement further composes a controller module configured in operable association with the sensing assembly and actuating assembly, the controller module configured operable for facilitating or enabling a first mode of operation of the first or second actuator modules for steering of the tracking frame assembly, and for facilitating or enabling a second mode of operation in which steering of the tracking frame assembly is conducted in a substantially manual manner.

In one embodiment, the controller module s configured so as to enable or facilitate any of the following operations in either or both of the first and or second modes of operation:
  (i) resist further movement of the conveyor belt in a transverse direction of the conveyor belt;
  (ii) bias the conveyor belt to or toward an alignment of the conveyor belt prior to said position or movement being sensed;
  (iii) restore alignment of the conveyor belt to one substantially in accordance with general operation of the conveyor belt assembly;
  (iv) take no action in respect of the conveyor belt.

In various embodiments, the actuator, sensing, and or stop/reaction assemblies may comprise any embodiment of the actuator, sensing, and stop/reaction assemblies respectively as are described herein.

According to a further principal aspect, there is provided a method for managing, at least in part, alignment of a moving conveyor belt by way of adjustment (manual or otherwise) of a tracking frame assembly supported by support structure, the method comprising:
  sensing a position or movement of a portion or region of the moving conveyor belt, and
  based on at least the sensed position or movement of the moving conveyor belt, initiating or not initiating an adjustment or modification to a position, alignment, or orientation of a portion or region of the tracking frame assembly by adjustment of same by way of an actuator assembly provided between the tracking frame assembly and the support structure, the actuator assembly configured operable for selective urging against a stop assembly so as to assist in, at least in part countering or correcting an alignment of the conveyor belt.

According to a further principal aspect, there is provided a method of installing or associating an arrangement as described herein for operable use with a tracking frame assembly of a conveyor belt assembly or system.

According to another principal aspect, there is provided a method of retrofitting an arrangement as described herein for operable use with a tracking frame assembly of a conveyor belt assembly or system.

According to another principal aspect, there is provided a conveyor belt assembly operable for operating a conveyor belt, the conveyor belt assembly comprising at least one embodiment of an arrangement as described herein operably configured for use with either or both of a 'carry' or 'return' section(s) of the conveyor belt.

Various principal aspects described herein can be practiced alone or combination with one or more of the other principal aspects, as will be readily appreciated by those skilled in the relevant art. The various principal aspects can optionally be provided in combination with one or more of the optional features described in relation to the other principal aspects. Furthermore, optional features described in relation to one example (or embodiment) can optionally be combined alone or together with other features in different examples or embodiments.

For the purposes of summarising the principal aspects, certain aspects, advantages and novel features have been described herein above. It is to be understood, however, that not necessarily all such advantages may be achieved in accordance with any particular embodiment or carried out in a manner that achieves or optimises one advantage or group of advantages as taught herein without necessarily achieving other advantages as may be taught or suggested herein.

BRIEF DESCRIPTION OF THE DRAWINGS

Further features of the inventive principles are more fully described in the following description of several non-limiting embodiments thereof. This description is included solely for the purposes of exemplifying the inventive principles. It should not be understood as a restriction on the broad summary, disclosure or description as set out above. The description will be made with reference to the accompanying drawings in which.

Figure 1:
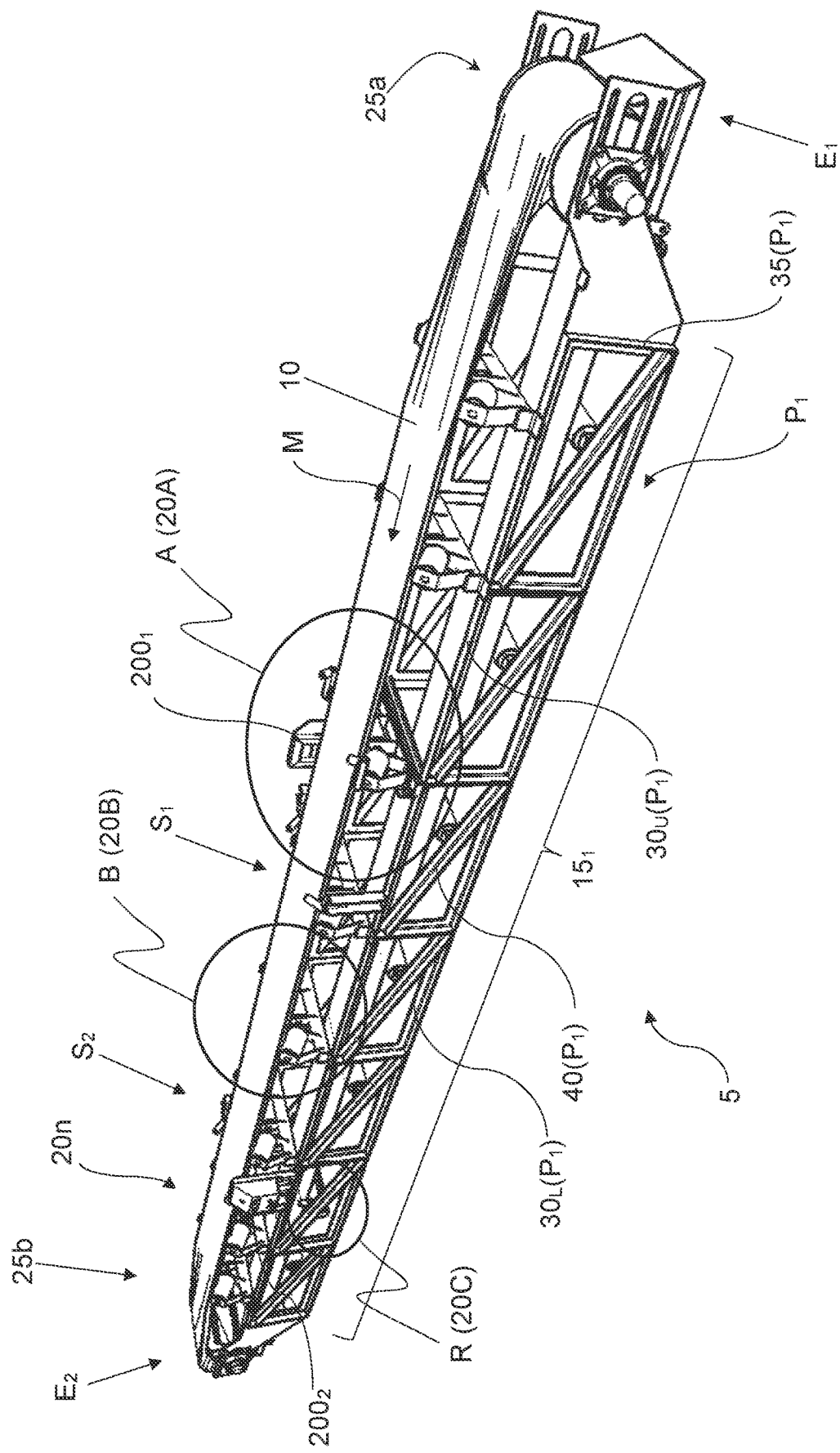
FIG. 1 shows a perspective view of one embodiment of a conveyor best assembly operable with an arrangement configured in accordance with the principles described herein, and provided on the 'carry' side of the shown conveyor belt)

In the figures, like elements are referred to by like numerals throughout the views provided. The skilled reader will appreciate that elements in the figures are illustrated for simplicity and clarity and have not necessarily been drawn to scale. For example, the dimensions and/or relative positioning of some of the elements in the figures may be exaggerated relative to other elements to facilitate an understanding of the various embodiments exemplifying the principles described herein. Also, common but well understood elements that are useful or necessary in a commercially feasible embodiment are often not depicted in order to provide a less obstructed view of these various embodiments. It will also be understood that the terms and expressions used herein adopt the ordinary meaning as is accorded to such terms and expressions with respect to their corresponding respective areas of inquiry and study except where specific meanings have otherwise been set forth herein.

It should be noted that the figures are schematic only and the location and disposition of the components can vary according to the particular arrangements of the embodiment (s) as well as of the particular applications of such embodiment(s).

Specifically, reference to positional descriptions, such as 'lower' and 'upper', and associated forms such as 'uppermost' and 'lowermost', are to be taken in context of the embodiments shown in the figures, and are not to be taken as limiting the scope of the principles described heroin to the literal interpretation of the term, but rather as would be understood by the skilled reader.

Embodiments described herein may include one or more range of values (eg. size, displacement and field strength etc). A range of values will be understood to include all values within the range, including the values defining the range, and values adjacent to the range which lead to the same or substantially the same outcome as the values immediately adjacent to that value which defines the boundary to the range.

Other definitions for selected terms used herein may be found within the detailed description and apply throughout. Unless otherwise defined, all other scientific and technical terms used herein have the same meaning as commonly understood to one of ordinary skill in the art to which the embodiment(s) relate.

DETAILED DESCRIPTION

The words used in the specification are words of description rather than limitation, and it is to be understood that various changes may be made without departing from the spirit and scope of any aspect of the invention. Those skilled in the art will readily appreciate that a wide variety of variations, modifications, alterations, and combinations can be made with respect to the above described embodiments without departing from the spirit and scope of any aspect of the invention, and that such variations, modifications, alterations, and combinations are to be viewed as falling within the ambit of the inventive concept.

Throughout the specification and the claims that follow, unless the context requires otherwise, the word "comprise"

or variations such as "comprises" or "comprising", will be understood to imply the inclusion of a stated integer or group of integers but not the exclusion of any other integer or group of integers.

Furthermore, throughout the specification and the claims that follow, unless the context requires otherwise, the word "include" or variations such as "includes" or "including", will be understood to imply the inclusion of a stated integer or group of integers but not the exclusion of any other integer or group of integers.

With reference to FIG. 1, one embodiment of a conveyor belt assembly 5 is shown. The conveyor belt assembly 5 comprises a continuous moving conveyor belt (hereinafter, belt 10) supported by way of a plurality of support assemblies 20n (often referred to as 'tracking frames' or 'tracking frame assemblies', collectively referred to herein as support assemblies 20) provided along a length of support structure 15 for supporting both the 'carry' and 'return' sections of the belt. The conveyor belt assembly 5 also comprises end roller assemblies 25a, 25b arranged at opposite ends $E_1$, $E_2$, of the support structure 15. Each end roller assembly 25a, 25b is configured so as to allow for the change in direction of the moving belt 10 (ie. from 'carry' (the upper surface of the belt shown) to 'return' states of operation (the section of the belt shown lowermost)). One or both of the end roller assemblies 25a, 25b may comprise a motor arrangement which is configured so as to drive the belt 10. The embodiment shown incorporates arrangements operable for correcting any detected misalignment of the belt 10 during operation (as will be described below).

Figure 4:
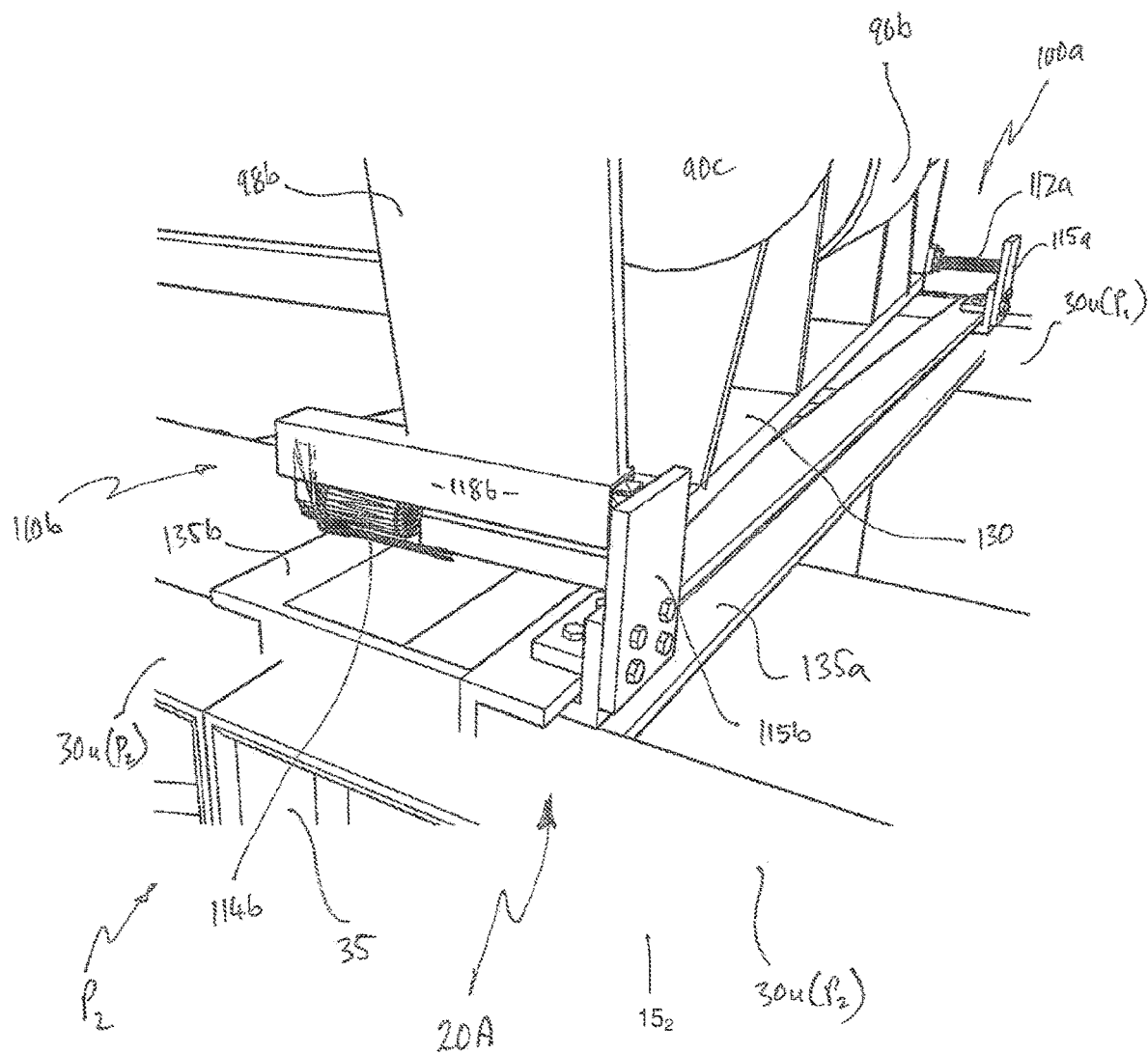
FIG. 4 shows a perspective close-up view of a region of the embodiment shown in FIG. 1.
Figure 5:
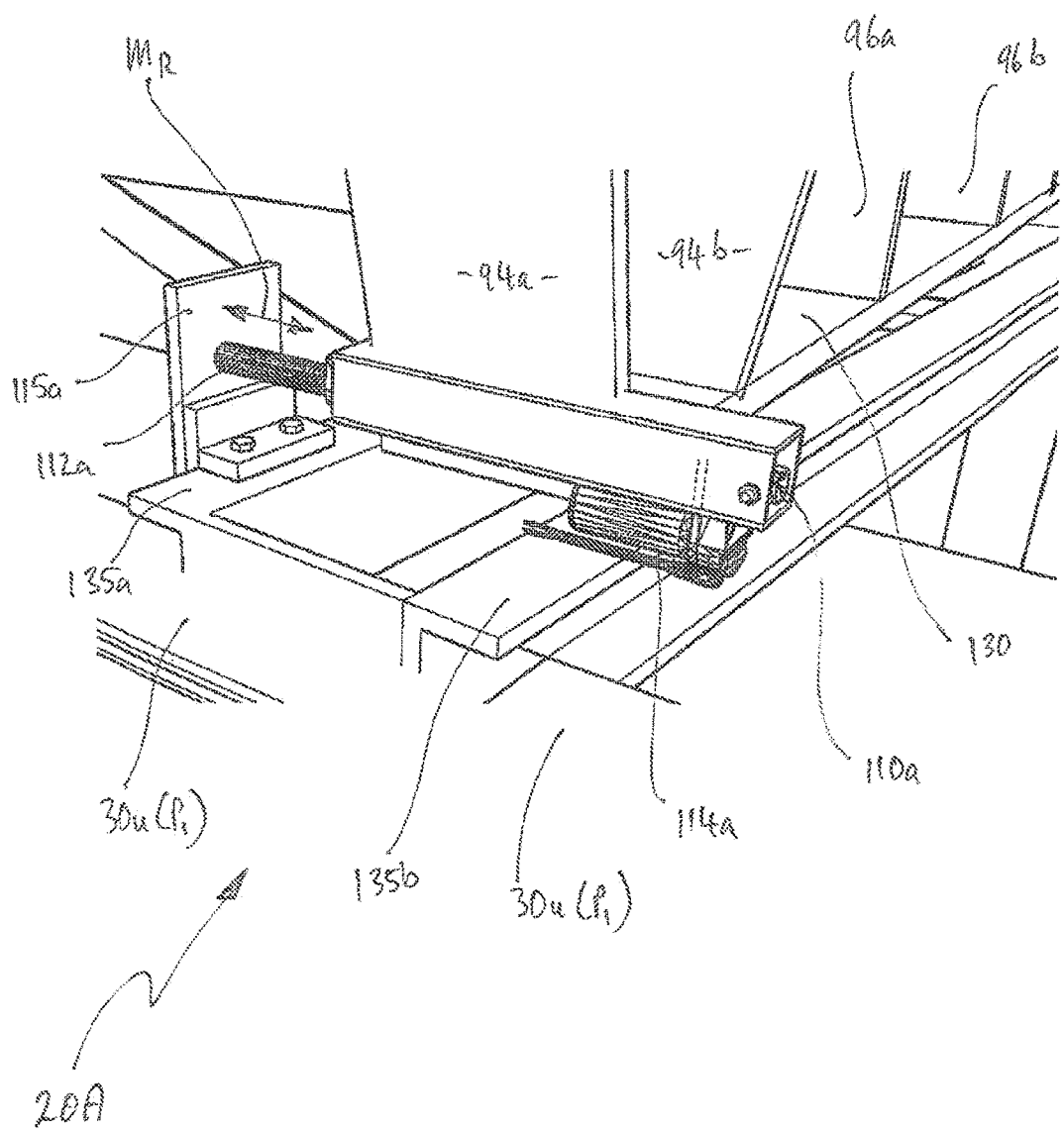
FIG. 5 shows a perspective close-up view of a region of the embodiment shown in FIG. 1.
Figure 6:
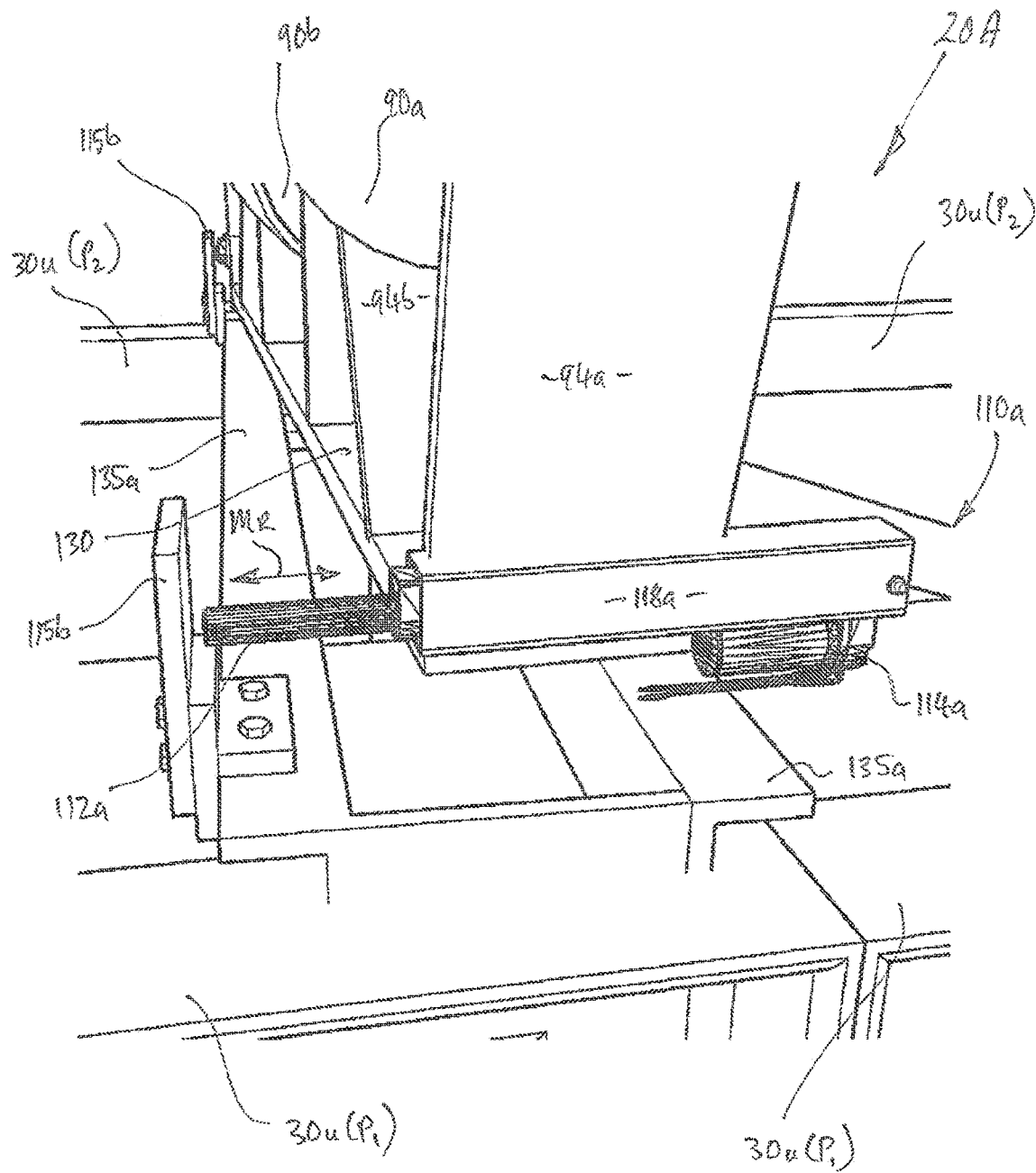
FIG. 6 shows a perspective close-up view of a region of the embodiment shown in FIG. 1.

The support structure 15i (shown in FIG. 1), 15a (shown in FIG. 4) comprises two parallel frame assemblies $P_1$, $P_2$, each formed having a plurality of horizontal 30 (subscripts "U" and "L" identify "upper" and "lower" members), vertical 35, and diagonal 40 aligned structural members configured so as to provide a supporting frame/truss structure of sufficient structural capacity to support the conveyor belt assembly 5. The parallel frame assemblies $P_1$, $P_2$ are interconnected by support structure (135a, 135b—see FIGS. 4 and 5—which spans across/between both assemblies $P_1$, $P_2$), support assemblies 20n, and a number of tower roller assemblies 50n (see FIG. 2) which operate with a return section 12 of the belt 10. The lower roller assemblies 50n each comprise an axle member 55 (and/or bearing assemblies), each end of which is held by or connected to respective portions/regions of parallel frame assemblies $P_1$, $P_2$ by way of respective brackets 56a, 56b, and a roller unit 60 for providing a rolling engagement with the 'return' section 12 of the belt 10.

The plurality of horizontal 30, vertical 35, and diagonal 40 aligned structural members of the parallel frame assemblies $P_1$, $P_2$, are generally elongate in nature and have a uniform cross along their length. In the embodiment shown in the figures, structural members 30, 35, and 40 are provided in the form of a right-angle section, however, it will be appreciated that any section could be used provided it confers the intended structural characteristics (eg. strength/stiffness).

FIG. 1 identifies three different types or forms of support assembly; 20A (shown in the circle marked 'A'), 20B (shown in the circle marked 'B'), and 20C (shown in the circle marked 'R'). The support assemblies 20A and 20C each embody the principles of the arrangement described herein.

Figure 2:
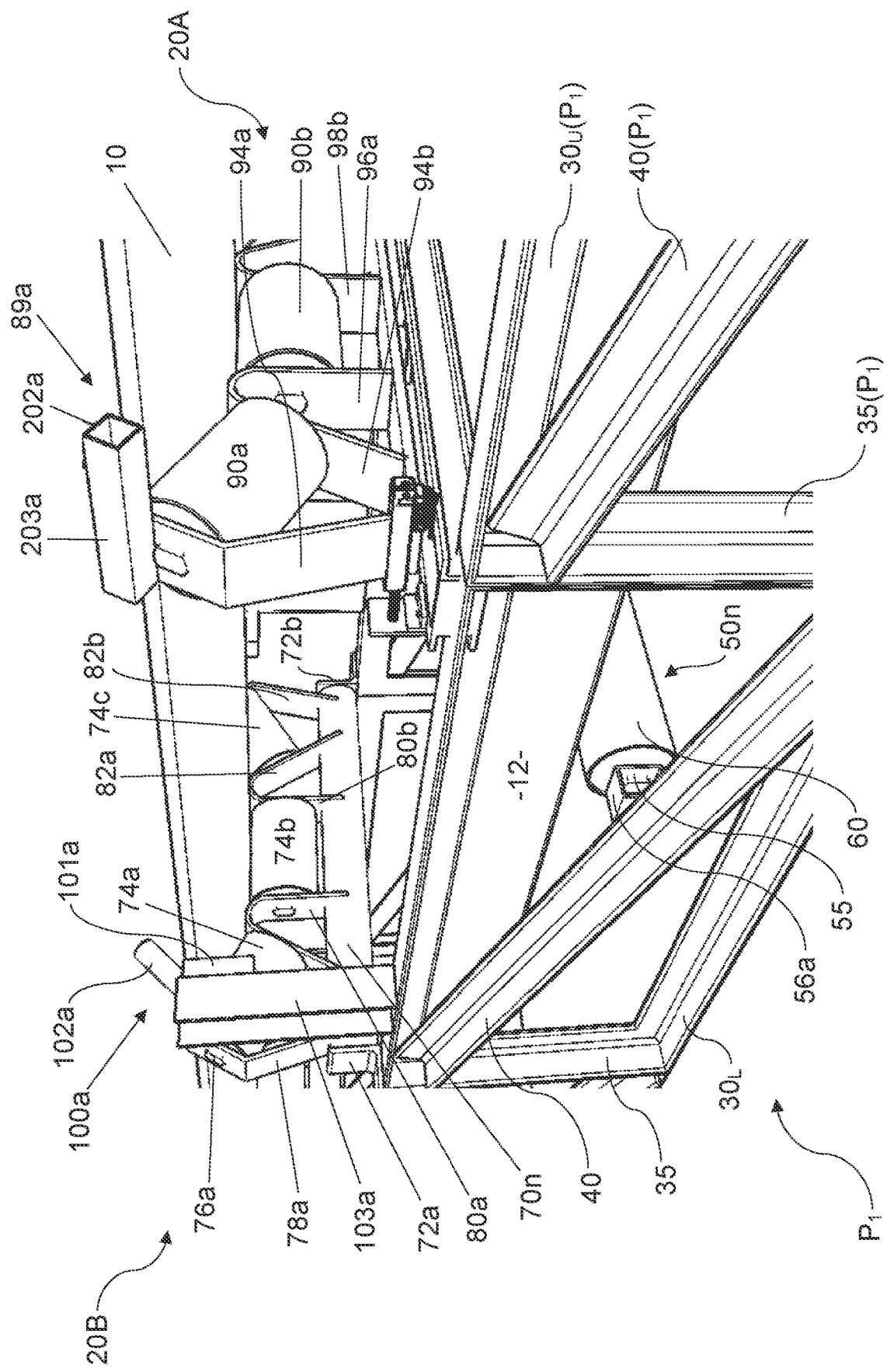
FIG. 2 shows a perspective close-up view of a region of the embodiment shown in FIG. 1.

With reference to FIG. 2, support assembly 20B is representative of a passive assembly comprising a cross member 70n interconnecting upper regions of the two parallel frame assemblies $P_1$, $P_2$, whereby each end of the cross member is connected to a respective parallel frame assembly by way of respective brackets 72a, 72b. Each cross member 70n supports three rollers 74a, 74b, and 74c (collectively, 74) in a manner allowing each roller 10 engage with the belt 10. Each roller 74 is arranged so as to rotate about respective axels 76a, 76b, 76c (and which may include bearing assemblies not visible in FIG. 2) supported at their opposite ends by portions of brackets connected to the cross member 70n. Regarding FIG. 2, axle 76a is supported by bracket portions 78a and 78b, axle 76b (hidden but implied) is supported by bracket portions 80a, 80b, and axle 76c (hidden but implied) is supported by bracket portions 82a, and 82b. The axles may be connected to the respective bracket portions by any means known to the skilled reader, such as for example, a nut belt fastening assembly, welding, etc.

Support assemblies 20A and 20C are configured operable with an arrangement arranged so as to counter and/or correct any misalignment of the moving belt 10 based on, at least in part, the senses position or movement of the belt. In the embodiment shown, the support assembly 20A is configured operable for use with the 'carry' section of the belt 10. The same operable principles of the working/function of the support assembly 20A are used for the support assembly 20C which operates with the 'return' section 12 of the belt 10. This 'return' section 12 arrangement is discussed further below with reference to FIGS. 14 to 17, and shown in FIGS. 22A and 22B.

For explanatory purposes, the core principles of the operation of the support assembly 20A will be described below. Following which, the operation of the support assembly 20C will be described. It will be appreciated that the same operable principles described in relation to the support assembly 20A apply also to the operation of the support assembly 20C.

Figure 3:
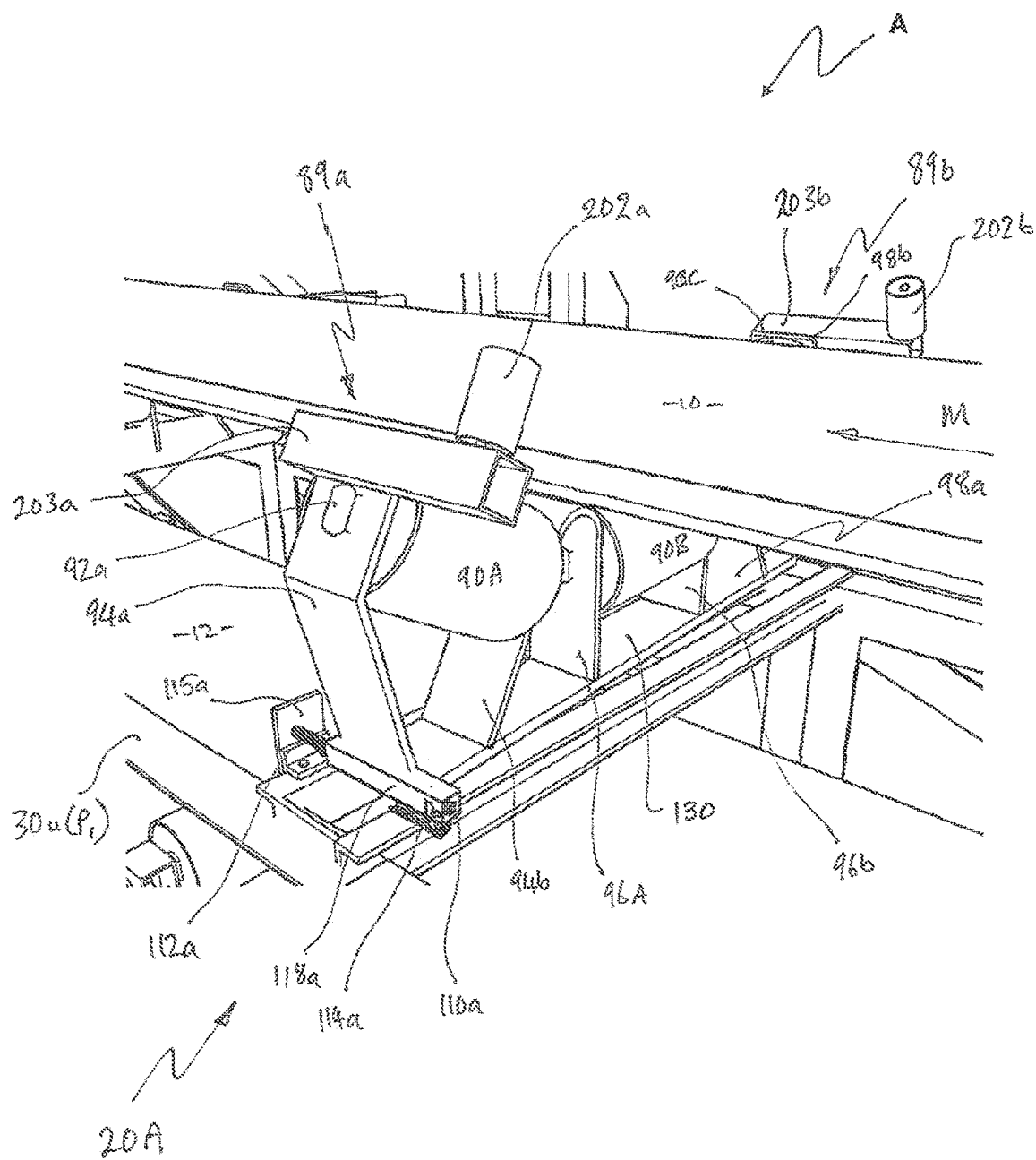
FIG. 3 shows a perspective close-up view of a further region (specifically, region A) of the embodiment shown in FIG. 1.

In its broadest form, and with reference to FIG. 3, the support assembly 20A comprises much of the same componentry as the support assembly 20B (which allows embodiments of the arrangement to be installed or retrofitted to existing tracking frame assemblies). In this regard, and with reference to FIG. 3, the roller assemblies are substantially the same. For example, each support assembly 20A comprises three rollers 90a, 90b, and 90c rotatable about respective axles 92a, 92b (hidden but implied), and 92c (hidden but implied). As shown, axle 92a is supported by bracket portions 94a, 94b, axle 92b is supported by bracket portions 96a, 96b, and axle 92c (not visible in FIG. 3) is supported by bracket portions 98a, 98b. As with support assembly 20B, the axles may be connected to the respective bracket portions by any means known to the skilled reader, such as for example, a nut belt fastening assembly. Similarly, bearings or bearing assemblies may be included to assist rotation. The support assembly 20A further comprises edge roller assemblies 89a, 89b provided at respective sides of the belt 10, and spaced from the respective edge of the belt. The edge roller assemblies 89a, 89b each comprise respective rollers 202a, 202b which are configured so as to be capable of engaging (eg. rolling engagement/contact) the respective adjacent edge portions/regions of the belt 10.

Figure 10A:
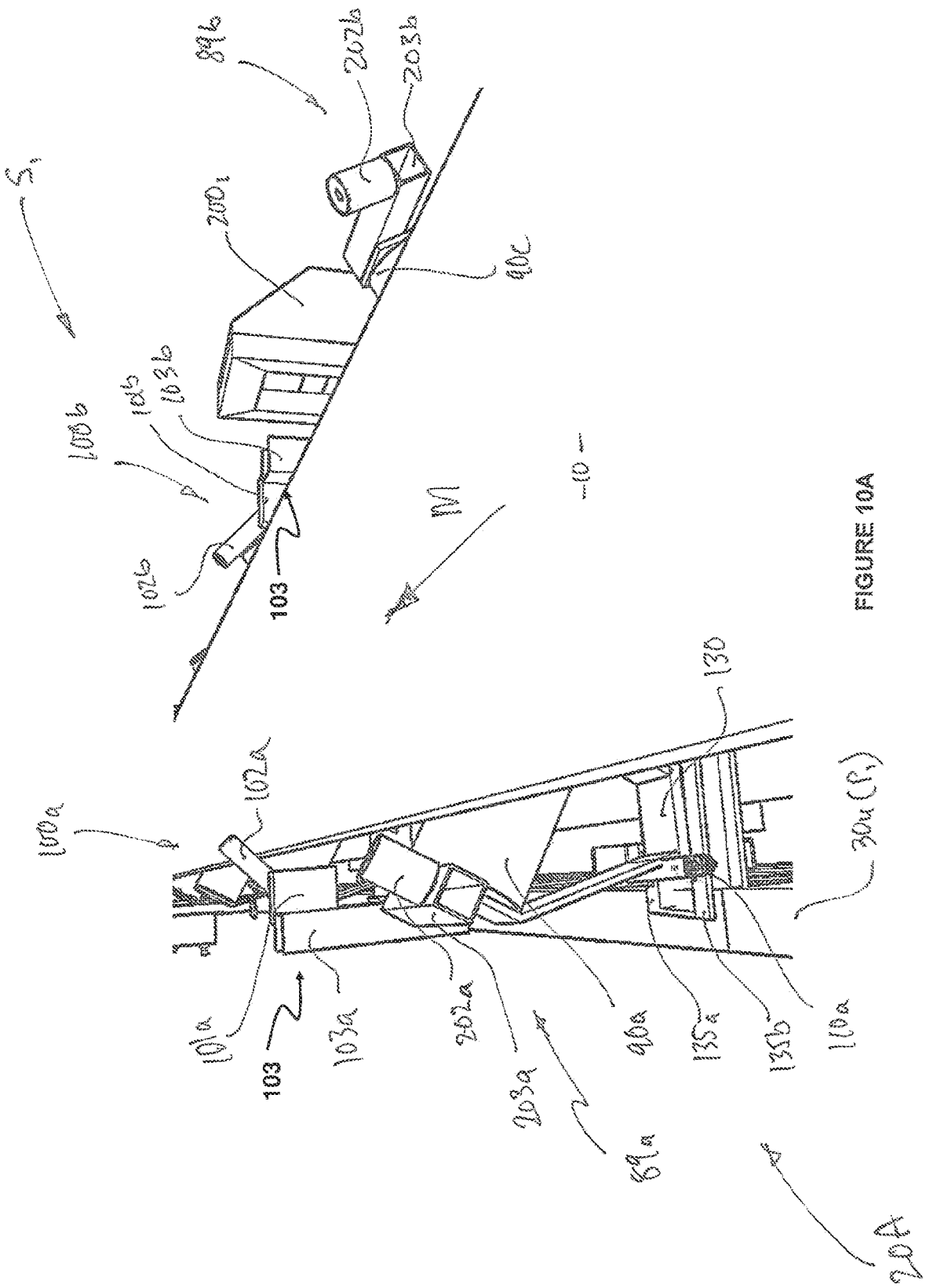
FIG. 10A shows a perspective close-up view of a region of the embodiment shown in FIG. 1.
Figure 10B:
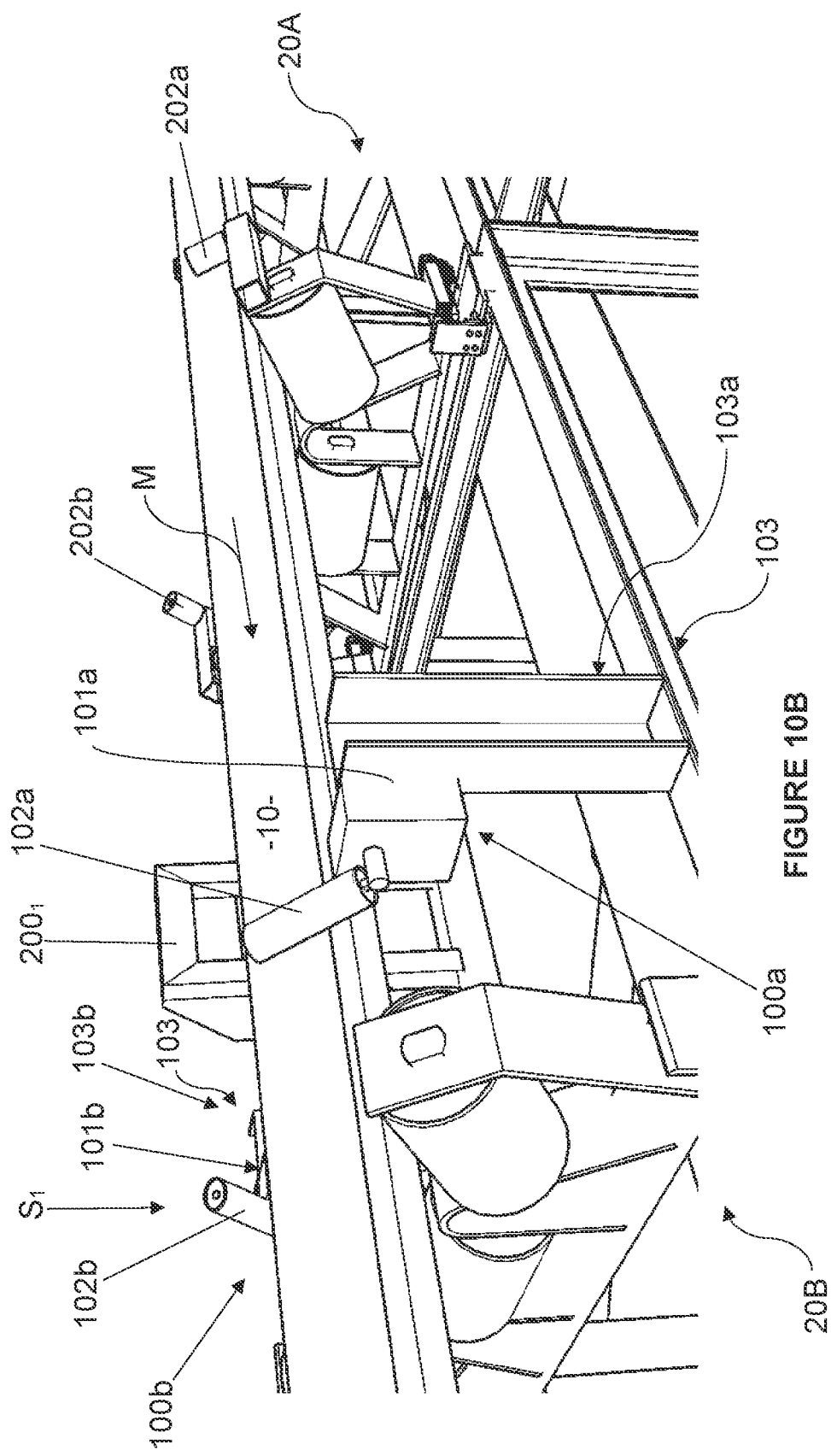
FIG. 10B shows another perspective view of a region of the embodiment shown in FIG. 1.

In the form shown in the Figures, and particularly FIG. 10A, the arrangement associated with support assembly 20A comprises a sensing assembly comprising one or more sensor modules (provided in the form of switch modules 100a, 100b) arranged on respective sides of the belt 10 by way of bracket assemblies 103. Switch modules 100a, 100b also comprise respective electronics units 101a, 101b which are housed and supported at or near an upper region of respective uprights 103a, 103b (see also FIG. 10B). Furthermore, the sensing assemblies can be provided at one or more locations along the length of the conveyor belt assembly 5. In this manner, the sensor modules can be located at locations considered to be relevant in the assessment of the alignment of the belt 10 during operation. In the embodiment shown in the Figures, sensing assemblies are placed at two locations $S_1$, $S_2$ (see FIG. 1) along the length of the conveyor belt assembly 5, with sensor modules (100a, 100b, 100c, 100d) being placed either side of the belt 10. Specifically, sensor location $S_1$ (using sensor/switch modules 100a, 100b) relates to the support assembly 20A for use with the 'carry' section of the belt 10, and sensor location $S_2$ (using sensor/switch modules 100c, 100d—see FIGS. 14 and 22A, 22B and discussion below) relates to the support assembly 20C for use with the 'return' section 12 of the belt 10. The skilled reader would readily appreciate that various locations could be chosen for placement of the sensing assemblies to cater for the circumstance at hand.

Each sensor/switch module 100a, 100b (and indeed. 100c, 100d) is configured for sensing a position or movement of a portion or region of the moving belt 10. Each switch module 100a, 100b (100c, 100d) comprises a respective sensor or sensor module 102a, 102b (102c, 102d). In the arrangement shown, the switch modules 100a, 100b are supported by uprights 103a,b (which as shown are supported by upper horizontal beams $30_f$ of the parallel frame assemblies $P_1$, $P_2$) at two locations $S_1$, $S_2$ along the length of the conveyor belt assembly 5 so that respective sensors 102a, 102b are adjacent a respective edge portion or region of the belt 10 and capable of registering a contact force when said edge portion or region makes contact with a respective sensor 102a, 102b. The switch modules are configured so that any contact occurring between the respective sensors 102a, 102b (and sensors 102c, 102d) and the respective edge portions or regions of the belt 10 that each are adjacent to, indicates a misalignment of the moving belt or a breach/transgression of a pre-defined or set limit. Such indication can then inform a response sufficient to seek to correct the alignment of the belt 10 (as said sensing indicates that a misalignment has occurred or is likely to occur).

Each sensor 102a, 102b (and sensors 102c, 102d) (and, indeed, and/or the respective switch modules 100a, 100b) is positioned substantially symmetrical about a central axis of the belt 10 and held a distance from an end portion or region of respective sides/edges of the belt: such distance corresponding (see limits $L_1$, $L_2$ in FIGS. 12A, 12B) with an acceptable proximity for intended purposes (for example, the distance being in accordance with an acceptable (or non-acceptable) operational alignment tolerance for the belt 10) The distance of limits $L_1$, $L_2$ from respective edges of the belt 10 could be any suitable distance (eg. width of the belt, width of the rollers, etc) appropriate for the circumstance at hand. For example, the distances could vary from about 50 mm to about 150 mm and with some flexibility (ie. embodiments could incorporate variable positionable sensors). Without being bound by theory, the variance is largely due to the variation in belts: some belts will move very little and therefore the preferable distance is less, and some belts will constantly 'snake' where the distance should (generally) be in the larger range. The skilled reader would readily appreciate the nature/magnitude of such distances/limits. The latter discussion on the limits $L_1$, $L_2$ applies also to the sensor modules 100c, 100d for the arrangement used with the support assembly 20C for the 'return' section 12 of the belt 10 where applicable limits would also apply.

In the form shown in the Figures and described herein, the position of the sensors 102a, 102b (and sensors 102c, 102d) relative to the edge of the conveyor belt is fixed. However, the sensors 102a, 102b (and/or the switch modules 100a, 100b) may be configured so that their position relative to the belt 10 can be varied. In such embodiments, this variation could be by way of manual manipulation or could be conducted remotely by remote control means (such as, for example, from a centralized site/location). For example, the switch modules (100a, 100b) anchor their respective sensors (102a, 102b) could be supported by way of, for example, respective servo motor (or suitable equivalent actuators) arrangements configured so that the distance between the sensors (102a, 102b) and an edge portion of the conveyor belt 10 can be varied as required/needed—allowing, for example, limits $L_1$, $L_2$ to be varied/changed as might be required for a certain situation (for example, if a conveyor belt of a different width is used, or if the limit tolerance were to be tightened/constrained or relaxed, depending on the circumstances at hand). Embodiments of this form could have advantage in being able to provide improved control of conveyor belt tracking in being able to respond (relatively quickly and efficiently as compared existing solutions) to (correct) any misalignment occurring (or considered likely to occur) along the full length of the conveyor belt. For example, software profiles/strategies could be developed that allow for a large number of responses to be actioned depending on any developing circumstance(s).

Figure 7:
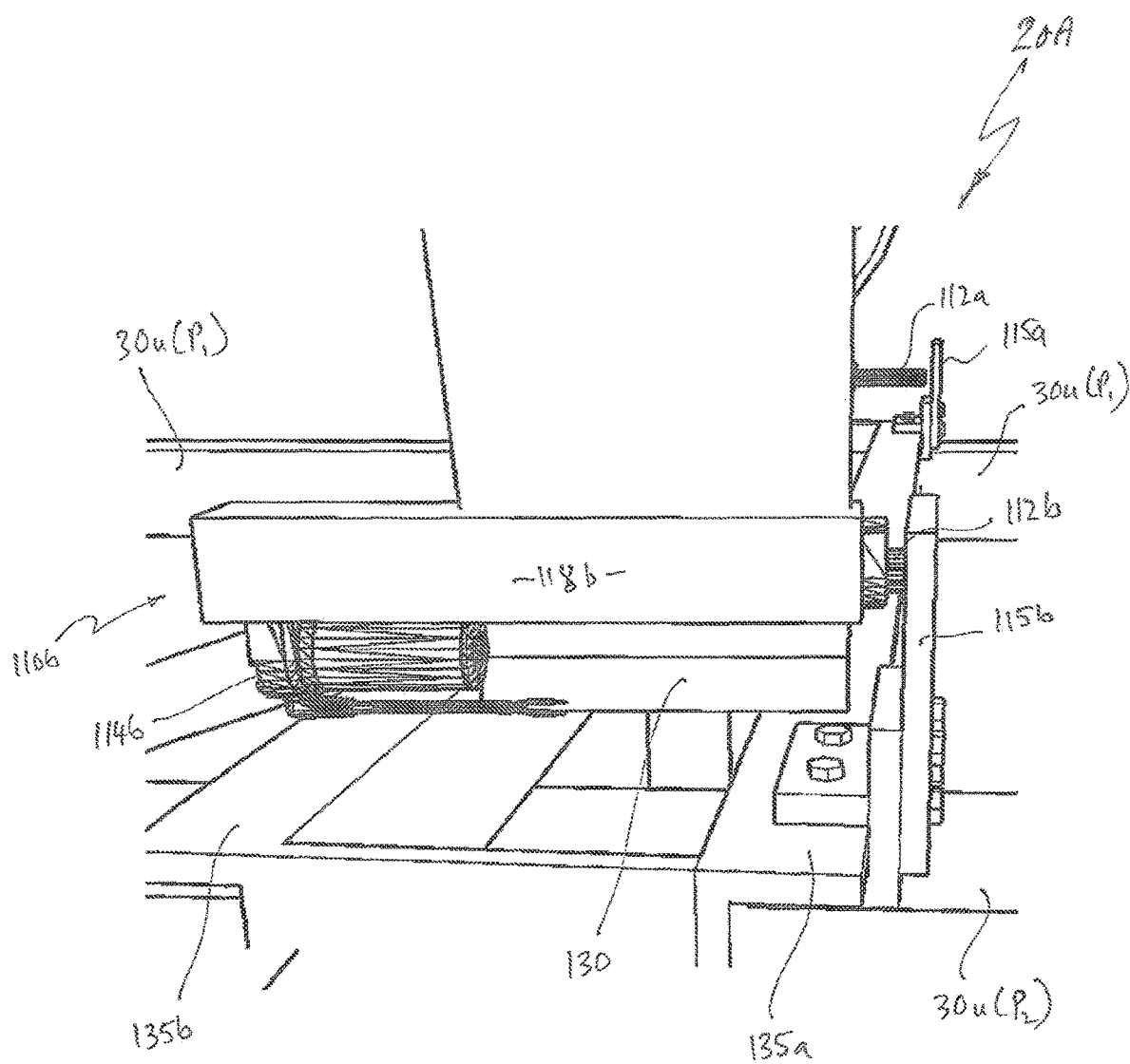
FIG. 7 shows a perspective close-up view of a region of the embodiment shown in FIG. 1.

With reference to FIG. 3, the arrangement further comprises an actuator assembly comprising one or more actuator modules (provided in the form of linear actuators 110a, 110b (not visible in FIG. 3, but shown in FIG. 4)) arranged on respective sides of the belt 10, in a substantially symmetric manner. For the embodiment shown, a rod or screw 112a (hereinafter, rod 112a/b) of the linear actuator 110a is operated by a motor unit 114a (of the linear actuator 110a) to engage or contact (so as to urge against) a reaction or stop plate 115a (hereinafter, reaction plate 115a) of a reaction or stop assembly 115 (hereinafter, stop assembly 115) supported by way of cross member 135a of support structure 135 (see FIGS. 5, 6, 7, and FIG. 19). Similarly, rod 112b of the linear actuator 110b is operated by a motor unit 114b (of the linear actuator 110b) to engage or contact (so as to urge against) a reaction or stop plate 115b (hereinafter, reaction plate 115b) of the stop assembly 115 also supported by way of cross member 135a of support structure 135 (see FIGS. 7 and 8). As shown, reaction plates 115a, 115b arc connected (by way of being connectable via suitable fastening/mounting assemblies) to cross member 135a so as to be stationery relative to the rotatable pivotable support assembly 20A (described below). In this arrangement, the reaction plates 115a, 115b are configured so as to be connectable to appropriate support structure such that the reaction plates can be retrofitted to existing tracking frame assemblies. Urging of the actuators 110a, 110b (and 380a, 360b) against the respective reaction/stop plates 115a, 115b (and 350a, 350b) is selective h nature for selective rotation/pivoting of the support assembly 20A (and 20C) when required for belt 10 alignment correction purposes.

As the skilled reader would readily understand, the linear actuators 110a, 110b are each operable so as to operate their respective rods 112a, 112b respectively to extend or retract (movement of the rod 112a shown in FIG. 5 and FIG. 6 by reference identifier $M_R$) by way of the operation of their respective motor units 114a, 114b. Each linear actuator 110a, 110b is supported by way of a suitably engineered tube section 118a, 118b (square tube sections shown—see FIG.

20 for a perspective view of another suitable embodiment) which connect (using appropriate clamping or mounting assemblies, as would be known to the skilled reader) to the base regions of brackets 94a and 98b respectively in this manner, each linear actuator 110a, 110b is configured so as to reside stationary with respect to the position of the rollers 90a, 90b, and 90c, as will be discussed further below. Substantially the same componentry and configuration is replicated on the other side of the support assembly 20A (see FIGS. 4, 7, and 8).

Figure 8:
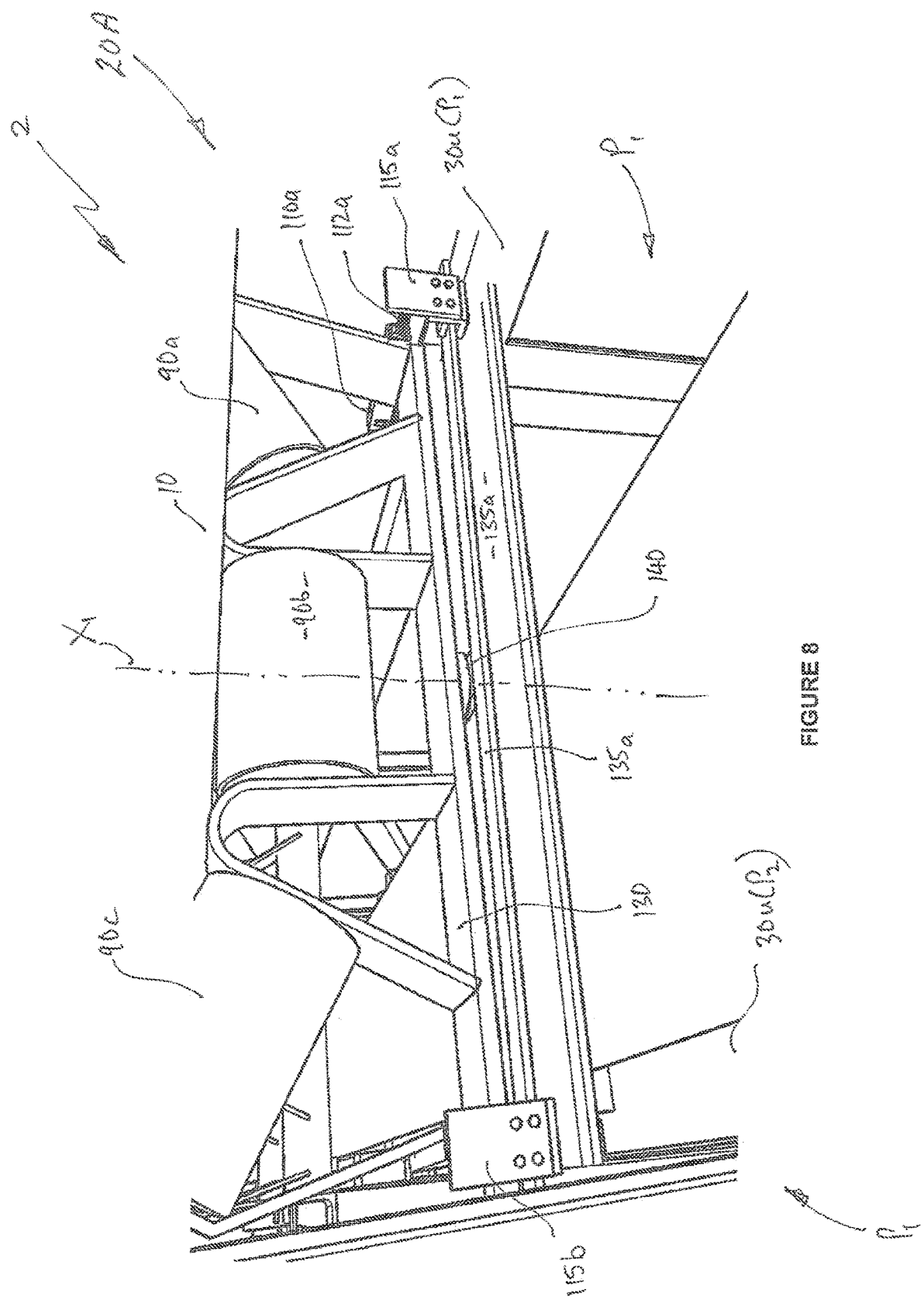
FIG. 8 shows a perspective close-up view of a region of the embodiment shown in FIG. 1.
Figure 9:
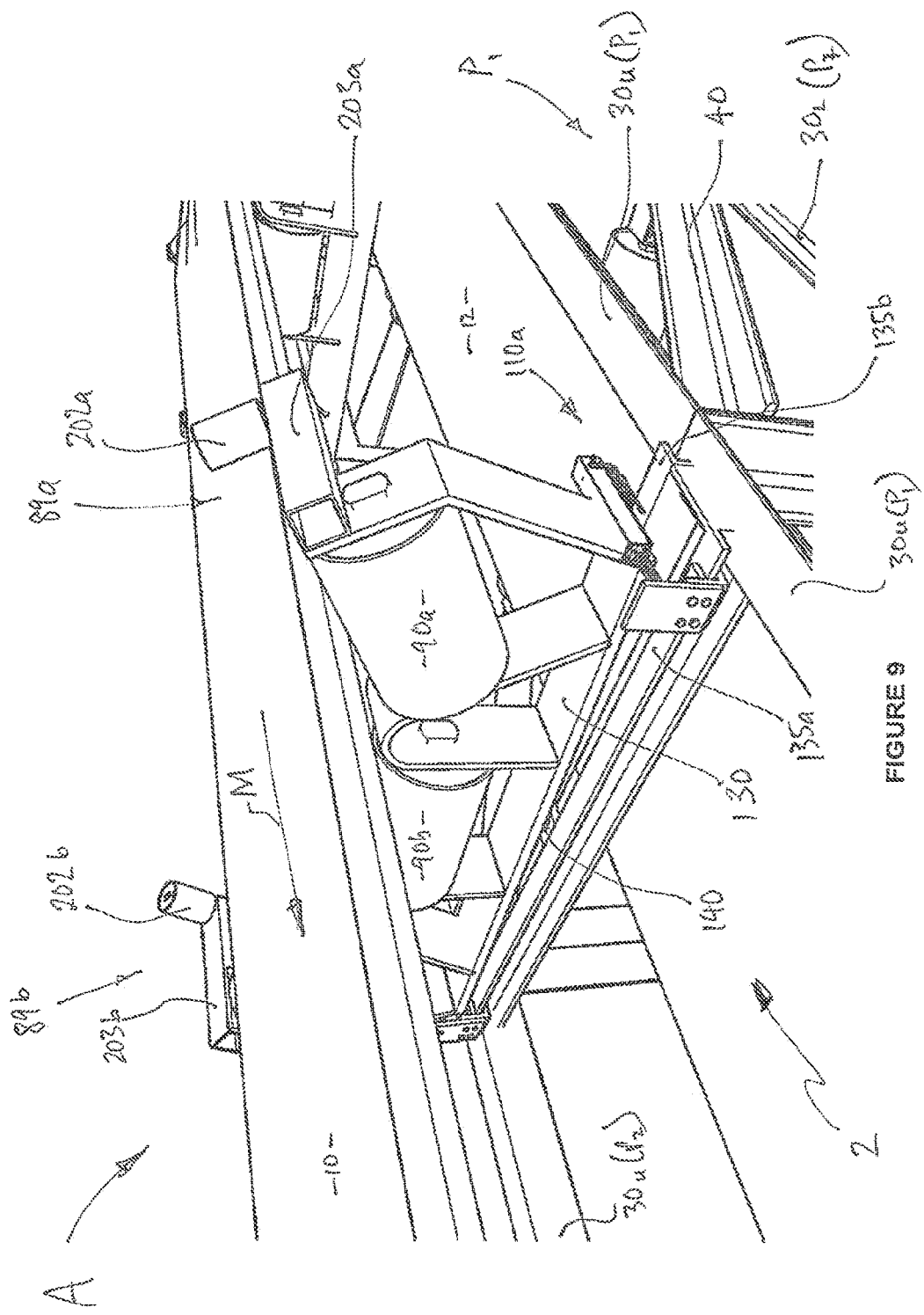
FIG. 9 shows a perspective close-up view of a region of the embodiment shown in FIG. 1.

With reference to at least FIGS. 4, 5, 6, 7, and 8, the support assembly 20A comprises a base member 130. The bracket portions (94, 96, 98) supporting rollers 90a, 90b, and 90c of the support assembly frame 20A are supported by way of the base member 130. The base member 130 is rotationally or pivotably engaged with a cress member assembly 135 (which comprises cross members 135a, 135b). As shown, cross members 135a, 135b each span across and interconnect the parallel frame assemblies $P_1$, $P_2$ whereby the cross members exist in a slightly spaced apart relationship with one another. With reference to FIG. 8, the base member 130 is supported by the cross-member assembly 135 by way of a bearing assembly 140 which is configured so as to allow the base member (130) to rotate about an axis X (see FIGS. 12A and 12B) which is aligned substantially in the vertical direction. In this manner, the base member 130 allows the supported edge rollers 202a, 202b and rollers 90a, 90b, 90c to rotate (ie. altering their relative position, alignment, or orientation relative to the belt and the overall conveyor belt assembly) about a central region between the parallel support frame assemblies $P_1$, $P_2$.

Figure 21A:
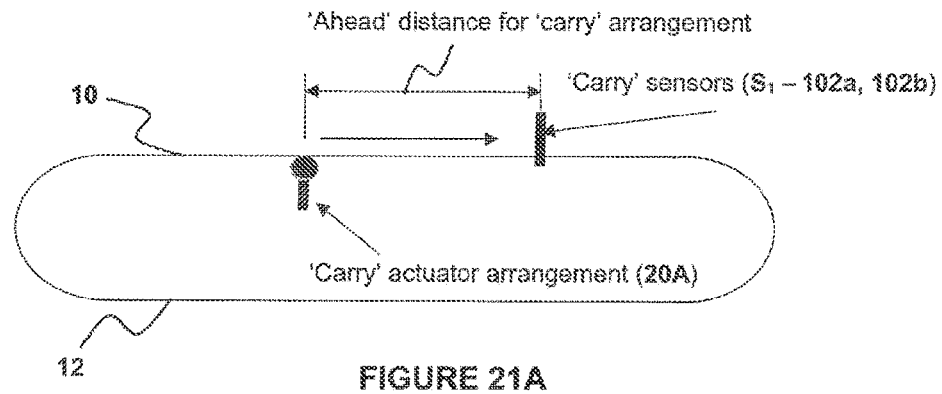
FIG. 21A shows a schematic elevation view showing the relative placement (not to scale) of the 'carry' sensing assembly with respect to the relevant actuator assembly for the 'carry' section of the belt.
Figure 21B:
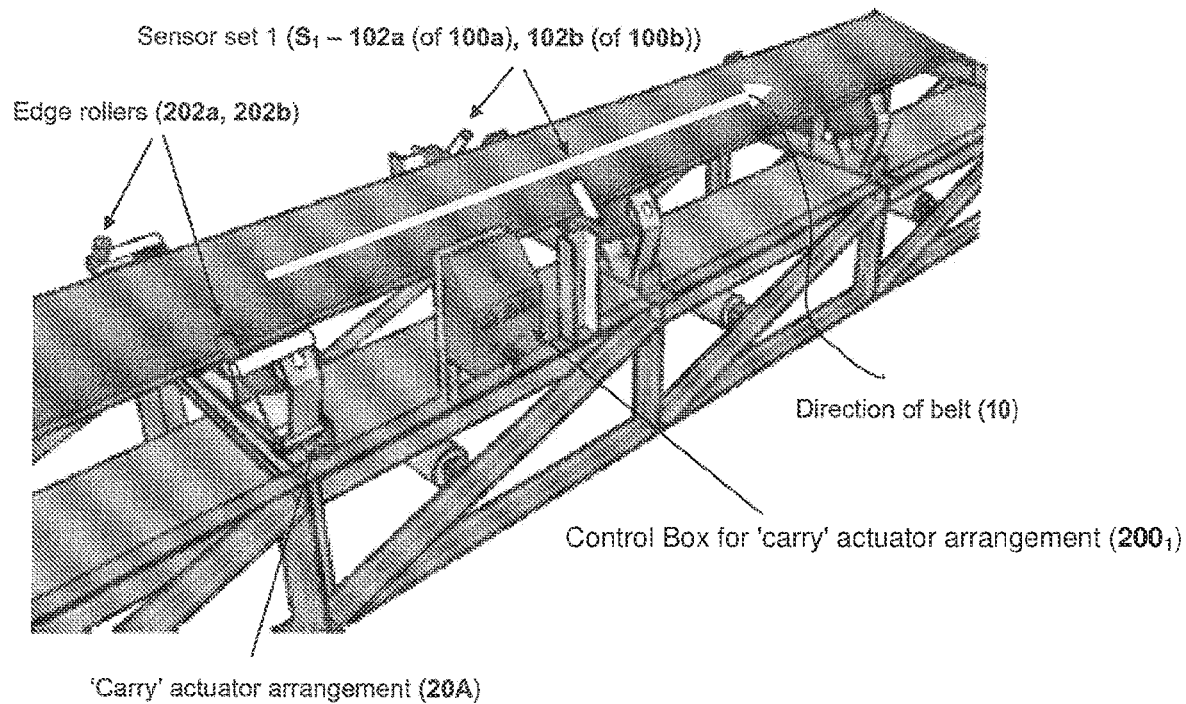
FIG. 21B shows a perspective view of an assembly drawing giving context to FIG. 21A.

As shown in the Figures, the sensors 102a, 102b are provided 'ahead' (relative to the moving direction M of the conveyor belt 10—sec FIGS. 21A, 21B) of the linear actuators 110a, 110b. Generally, as adjustments by existing tracking frames will not result in a conveyor belt alignment correction until some meters upstream of the adjusting tracking frame, using the principles of the arrangement, conveyor belt drift can be identified and corrected sooner than can be done with existing (passive) tracking frames. For example, if a loading zone is located directly after a tracking frame, the sensors 102a, 102b can pick up or identify conveyor belt misalignment (which could be caused by the loading zone) and make the appropriate corrections to the support assembly 20A (eg. tracking frame) before the loading zone so as to counteract the conveyor belt drift (caused by the loading zone). Thus, embodiments using the principles described herein can assist in correcting/counter conveyor belt mis-alignment with increased efficiency as compared existing solutions.

FIGS. 21A and 21B show a perspective view (FIG. 218) and a schematic view (FIG. 21A) of the relative positioning of the sensors 102a, 102b and the corresponding actuator arrangement (using linear actuators 110a, 110b) for the 'carry' section of the belt 10. Shown in FIG. 21A is the relative spaced 'ahead' distance between 'carry' sensors 102a, 102b and the corresponding 'carry' support assembly 20A. FIG. 21B shows the relevant 'carry' actuator componentry including the relevant control box $200_1$ (enclosing the relevant electronics for the sensors 100a, 100b and the actuator modules 110a, 110b) for controlling the actuator componentry based on the relevant sensory input.

Figure 22A:
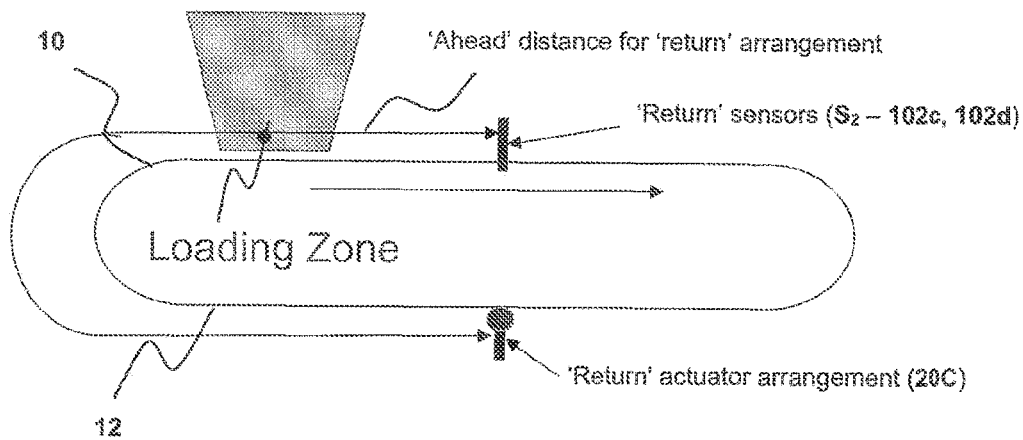
FIG. 22A shows a schematic elevation view showing the relative placement (not to scale) of the 'return' sensing assembly with respect to the relevant actuator assembly for the 'return' section of the belt.
Figure 22B:
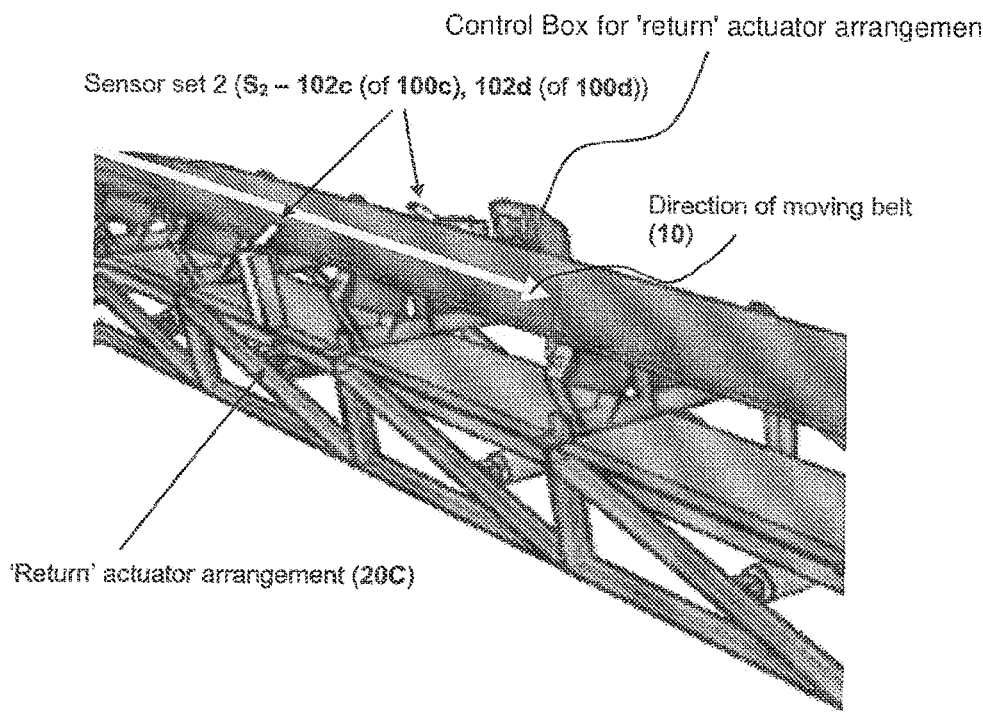
FIG. 22B shows a perspective view of an assembly drawing giving context to FIG. 22A.

Likewise, FIGS. 22A and 22B show a perspective view (FIG. 22B) and a schematic view (FIG. 22A) of the relative positioning of the sensors 102c, 102d and the corresponding actuator arrangement (using linear actuators 360a, 360b, as will be discussed below, but shewn in FIGS. 15 to 17) for the 'return' section 12 of the belt 10 (discussed further below with respect to FIGS. 15 to 17). Shown also is the positioning of a 'Loading zone' toward the upstream end of the 'carry' section of the belt 10 (such loading zones have the potential to cause belt misalignments). Shown in FIG. 22A is the relative spaced 'ahead' distance between 'return' section sensors 102c, 102d and the corresponding 'return' support assembly 20C FIG. 22B shows the relevant 'return' actuator componentry including the relevant control box $200_2$ (enclosing the relevant electronics for the sensor modules (100c, 100d) and actuator modules (360a, 360b)) for controlling the 'return' actuator componentry based on the relevant sensory input.

In general terms, the 'ahead' distances are difficult to quantify as the skilled reader will appreciate that all conveyor belts are different. However, without being bound by theory, generally speaking, an 'ahead' distance between about 2 and about 4 meters may be applicable for the 'carry' support assembly (20A) arrangement depending on, at least in part, the width, speed and load carrying capacity of the conveyor. And, for the 'return' arrangement (20C) between about 6 and about 12 meters may be applicable as the relevant sensor modules (102c, 102d) are placed alter the 'Loading Zone' (shown in FIG. 22A) and these can vary in length greatly Additionally, width, speed and load carrying capacity parameters can again be influential.

It will be understood that, ultimately, the sensing assemblies) could be spaced downstream of the actuator assembly (ie if it were considered to be appropriate for the circumstances at hand. Ultimately, any number of sensing assemblies could be placed at any respective location along the length of the belt 10 in order to improve or optimize the management (adjustment/correction action) of the alignment of the belt during operation.

Broadly, operation of the arrangement involves a sensing of a position or movement of a portion or region of the moving belt 10. In the embodiment shown, the position of the belt 10, when sensed by the switch modules 100a, 100b, corresponds to a misalignment condition (on the basis that triggering of the sensors 102a, 102b indicates that the belt has reached a set limit). Based on the sensed position of the belt 10, the arrangement operates to initiate an adjustment or modification to a position, alignment, or orientation of a portion or region of a support assembly (for example, the position of respective edge rollers 202a, 202b and/or rollers 90a or 90c (via rotating/pivoting of the support assembly 20A) supported by support assembly 20A, as the case may be) to assist, at least in part, maintaining a desired alignment of the belt as it moves. Adjustment or modification to a position, alignment, or orientation of a portion or region of the support assembly 20A serves to increase contact or engagement pressure applied to the belt 10 by way of the relevant rollers being brought into contact with the belt via the movement of the support assembly.

Figure 12A:
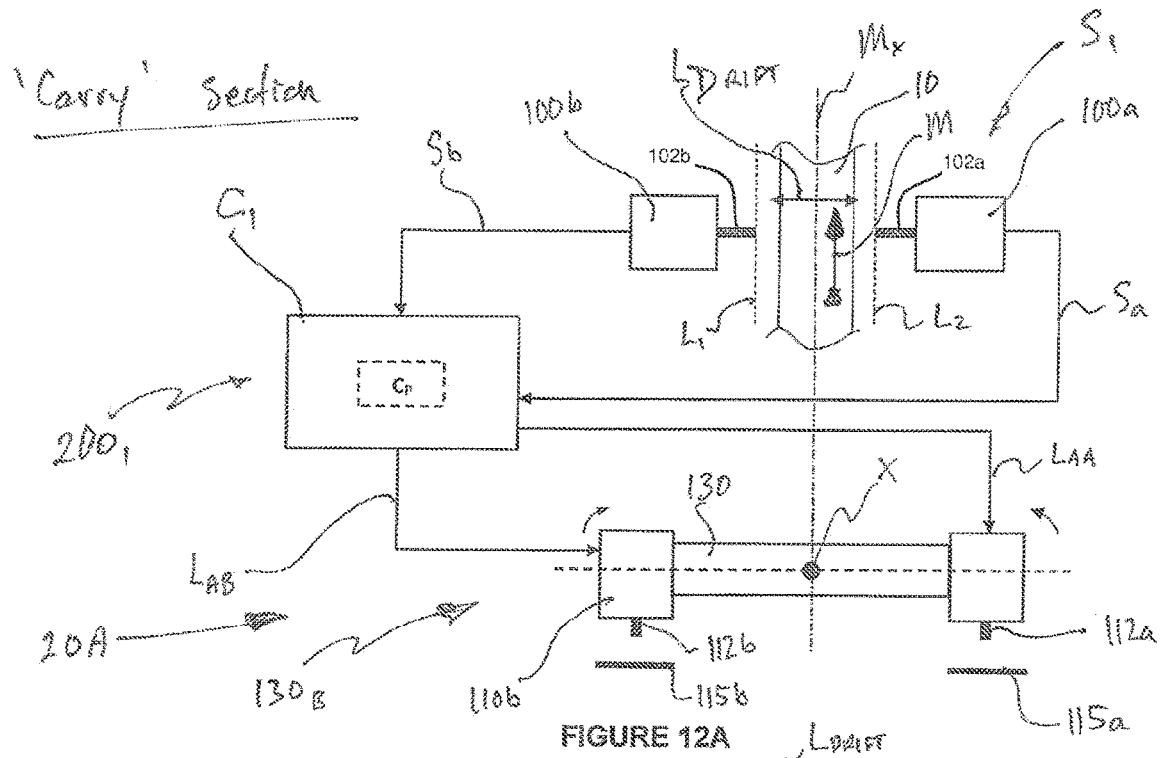
FIG. 12A shows a schematic view of one embodiment of the arrangement described herein in a first condition.
Figure 12B:
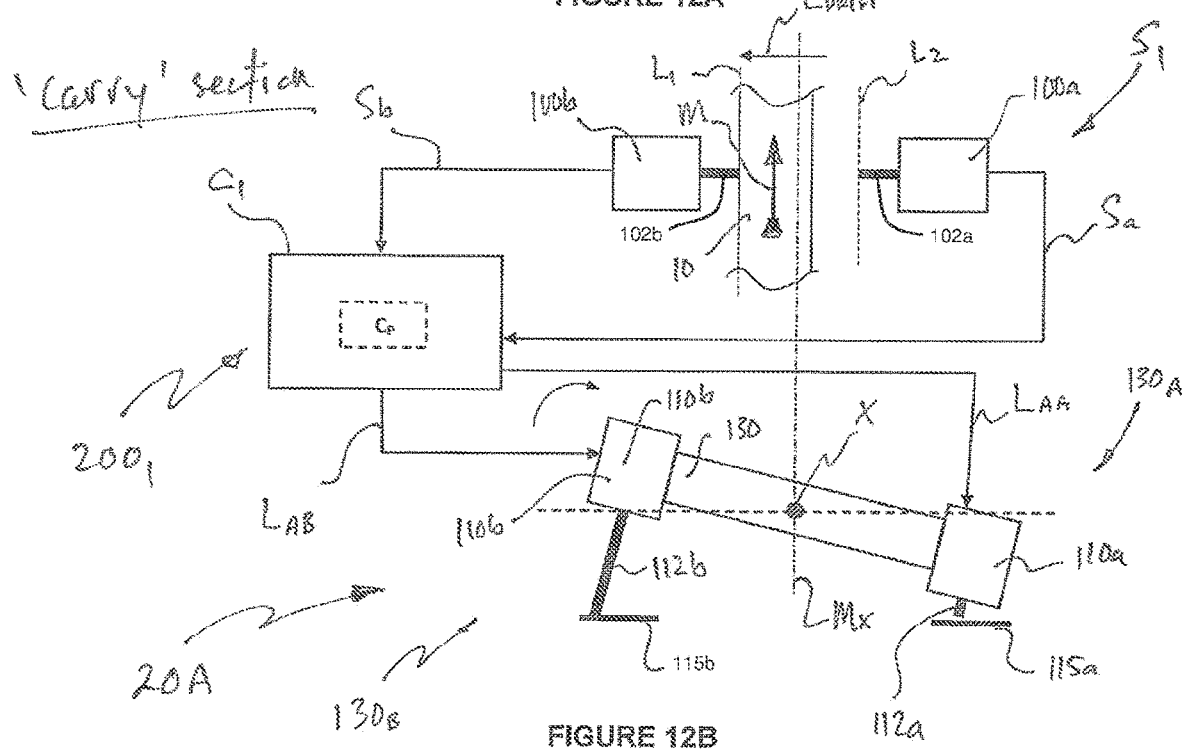
FIG. 12B shows a schematic view of the embodiment of the arrangement shown in FIG. 12A when adjusted or modified toward a second condition.

With reference to FIGS. 12A and 12B, to facilitate operation of the arrangement, a controller module $C_1$ (the identified $C_1$ is used in FIGS. 12A, 12B to delineate the 'carry' arrangement—it will be appreciated that a controller module $C_2$ operable with the arrangement used with the support assembly 20C for use with the 'return' section 12 of the belt 10) is provided and configured in operable association with the switch modules 100a, 100b and linear actuators 110a, 110b, and operable for operating the linear actuators so as to adjust or modify the position, alignment, or orientation of edge rollers 202a, 202b and/or rollers 90a, 90c as the case may be.

FIG. 12A shows the condition of the arrangement when the belt 10 is moving according to a desired alignment, this bearing substantially intermediate of limits $L_1$ and $L_2$ which correspond to limits that, when encroached upon, will trigger the respective sensors (102a, 102b). A central axis $M_X$ of the belt 10 is aligned with the centre region of the belt and substantially central or intermediate of the limits $L_1$, $L_2$. In this condition, the arrangement can be said to be in a "neutral" condition.

FIG. 12B shows the case where 'belt drift' (lateral or transverse drift relative to the direction of movement M of the belt 10) has occurred (drifting of the belt to the left when looking down on the belt) in direction $L_{Drift}$ sufficient so that an edge portion/region of the belt 10 encroaches on limit $L_1$, thereby triggering the relevant sensor 102a/b (for example). Corrective adjustment or modification is by way of the linear actuators (100a, 100b) becoming operable so as to apply a contact force (by way of extension/retraction of their respective rods 112a, 112b) on the respective reaction/stop plates 115a, 115b as and when needed based at least on the inputs from the switch modules (100a, 100b). In this manner, movement of the rollers 202a, 202b, 90a, or 90b (whichever is required) can be caused by way of the linear actuator (linear actuator 110b for the case shown in FIG. 12B) working to move (or pivot) the base member 130 (and the support assembly 20A) as appropriate. Thus, operation of the linear actuators 110a, 110b by way of their respective interaction with the corresponding stationary reaction plates 115a, 115b seeks to counter any misalignment, or operate to maintain the desired alignment condition of the belt 10.

In the manner shown, the configuration allows the support assembly 20A to be responsive (by way of, for example, steering the belt 10 by which ever roller is relevant) based on input from the switch modules 100a, 100b (via their respective sensor or sensor modules 102a, 102b) as to the position, movement, orientation, or alignment of the moving belt 10. As discussed above, the switch modules 100a, 100b serve to monitor the position/movement of the belt 10. The linear actuators 110a, 110b are configured so as to apply a contact force (by way of their respective rods 112a, 112b) to respective reaction/stop plates 115a, 115b. In this manner, extension of the rods (112a, 112b) contacting the stationary reaction plates (115a, 115b) and the rotational/pivoting freedom conferred to the base member 130. causes (in the state shown in FIG. 12B) a rotation or pivoting of the support assembly 20A, ie. for the case shown in FIG. 128, end 130b of the base member 130 is caused to rotate away from the reaction plate 115b. In this event, the corresponding roller(s) (likely roller 202b and/or roller 90c) will be brought into engagement (ie. rolling contact) with the adjacent edge portion or region of the belt 10 in a manner which serves to increase the contact pressure between the rollers 202b, 90c and the contacted edge portion or region of the belt. The pressure caused by this engagement has the effect of biasing, encouraging, or steering the belt 10 toward a more desired alignment condition. The relevant linear actuator remains operable in this manner until the alignment of the moving belt 10 is corrected. Thus, the interaction between the rods (112a, 112b) of the linear actuators (110a, 110b) serves to steer the support assembly 20A so as to counter any detected misalignment of the belt 10. In practice, a significant component of the increase in pressure to the belt 10 is by way of rollers 202a, 202b, 90a, 90c (whichever are relevant). However, it will be understood that engagement/contact pressure by way of roller 90b during pivoting of support assembly 20A could also be experienced.

It will be appreciated that extension of the md of one linear actuator in order to rotate or pivot the base member 130 appropriately may require the rod of the alternate linear actuator to retract, thereby reducing any possible interference that could compromise the required movement of the base member 130. For example, with reference again to FIG. 12B, rotation or pivoting of the base member 130 may be impeded if rod 112a of the linear actuator 110a is extended sufficiently to interfere with reaction plate 115a. As such, rod 112a may need to be retracted sufficiently (if not retracted already) so as to allow the appropriate movement of base member 130 to occur (ie. a clockwise rotation or pivot is intended for the case shown). In the embodiment described herein, such retraction of the rods 112a, 112b is undertaken substantially automatically.

It will be appreciated that the relative configuration of the reaction plates 115a, 115b and the corresponding linear actuators 110a, 110b could be changed, so as to operate in a 'reverse' manner. For example, the reaction plates 115a, 115b and the corresponding linear actuators 110a, 110b could be simply substituted. In this regard, the linear actuators 110a, 110b could be supported by the cross members 135a/b (of the support structure 135) and held stationery relative to the support assembly 20A, and the reaction plates 115a, 115b supported by the support assembly. In this manner, the same relative rotation or pivoting movement of the support assembly 20A could be achieved by way of the same interaction between the linear actuators (110a, 110b) and their respective reaction plates (115a, 115b). Accordingly, the interaction between the reds (112a, 112b) of the linear actuators (110a, 110b), if their relative positions were reversed, would continue to serve to steer the support assembly 20A so as to counter any detected misalignment of the belt 10. In this manner, the linear actuators (110a, 110b) and their respective reaction plates (115a, 115b) operate between the structure supporting the conveyor belt assembly and the support assembly 20A (for example, at or about an interlace or similar region between the structure supporting the conveyor belt assembly and the support assembly). Thus, the skilled reader will appreciate that such an embodiment is well within the scope of the principles described herein (as shown in FIGS. 15A, and 15B to 17).

In one form, the arrangement operable with the support assembly 20A comprises one or more actuator assemblies operable individually or in concert by way of the position or movement sensing of the belt 10. In one form, such sensing could be undertaken by way of one or more sensing assemblies being spaced along the length of the belt 10.

Figure 11B:
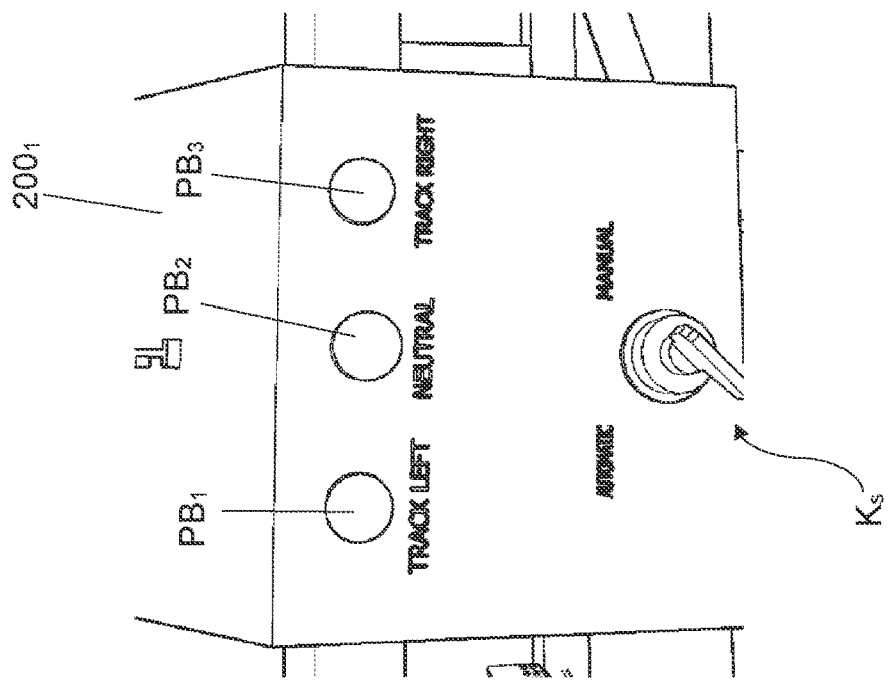
FIG. 11B shows a close-up view of the face of the control box shown in FIG. 11A.
Figure 11A:
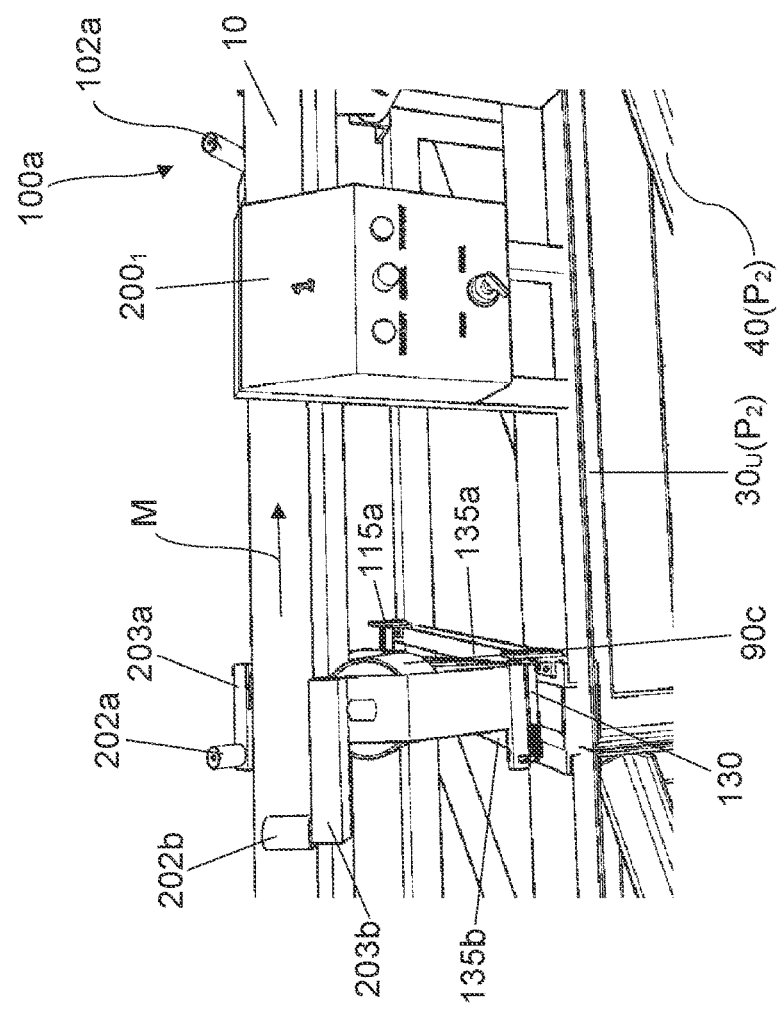
FIG. 11A shows a perspective close-up view of a region of the embodiment shown in FIG. 1, that showing installation of a control box configured for interface purposes.

With reference to FIGS. 11A and 11B, a control box $200_1$ is configured with control electronics (including controller module $C_1$). As shown in the FIG. 11A, the control box $200_1$ is provided near the support assembly 20A that it is intended to control/operate. The control box $200_1$ comprises various component (eg. control such as press-buttons, key-switches) allowing the user to initiate various characteristics/modes of the arrangement. As shown in FIG. 11B, the control box $200_1$ comprises hardware for the performing of the following functions:

(i) "TRACK LEFT"—Tracking the belt (10) left of the direction of movement (via a pushbutton $PB_1$).
(ii) "NEUTRAL"—Tracking the belt (10) left of the direction of movement (via a pushbutton $PB_2$).
(iii) "TRACK RIGHT"—Tracking tie belt (10) right of the direction of movement Tracking the belt (10) left of the direction of movement (via a pushbutton $PB_3$).
(iv) "MANUAL"—initiating Mode I of operation (via turning key switch $K_S$ clockwise)

(v) "AUTOMATIC"—initiating Mode II of operation (via turning key switch $K_S$ anticlockwise).

Embodiments of the arrangement can be operated in two modes: (Mode I) a substantially manual mode in which a user can, directly, interface with the control box $200_1$ for activating hardware (such as (or example, by way of pressbuttons) which activate one or both linear actuators 110a, 110b as might be needed.

On selection of Mode I (ie. manual operation) the electronics are configured so that direct access/control of the linear actuators (110a, 110b) is available to a user. As shown in FIG. 11B and discussed above, hardware (eg. push buttons $PB_1$, $PB_2$, $PB_3$ respectively) is provided for providing the following manual options: "TRACK LEFT", "NEUTRAL", and "TRACK RIGHT". Sensing of the alignment of the belt 10 would be generally achieved by way of sight by the user, and the appropriate linear actuator (110a, 110b) operated as necessary. Similarly, operation of the alternate linear actuator may be required in order to retract that actuator's rod (if needed). This may be done automatically by way of the controller module $C_1$. In the embodiment shown and described herein, this operation is arranged to occur automatically; for example, if the "TRACK LEFT" pushbutton is pressed, one linear actuator extends and the other retracts; if the "TRACK RIGHT" pushbutton is pressed, the opposite happens. This functionality also occurs when the system is operating in automatic mode (ie. Mode II).

Alternatively, further hardware maybe provided so that this functionality can be actuated manually by the user as appropriate.

When Mode I (manual mode) is selected the support assembly 20A (frame) can be adjusted either left or right to a desired amount to steer the belt 10 in either direction (as appropriate to correct any misalignment. This mode can be utilized, for example, when it is noticed that the relevant support assembly 20A (tracking frame) is seized with product being conveyed/carried and is not freely moving. Mode I (manual mode) can be selected to rotate/pivot the relevant support assembly left/right (for example, when looking down on the belt 10) to free the support assembly up without isolating the conveyor belt assembly 5. Mode I (manual mode) can also be utilised if it is noticed that one of the support assemblies (20A) or tracking frame servo rollers is damaged or missing. In such instances, the relevant support assembly 20A can be adjusted to achieve the required tracking. Moreover, Mode I (manual mode) has the potential to remove the (unsafe) practice of tying up a support assembly or tracking frame with a length of rope so as to bias, encourage, or steer the conveyor belt 10 left or right during operation.

In some embodiments, Mode I could be considered (or operated) as a 'calibration' mode in which a desired alignment of the belt 10 is defined or set. This calibration operation could then be used to define (or inform) the limits $L_1$, $L_2$ to which the Mode II state operates in respect of.

If "NEUTRAL" is selected, the arrangement operates as per an existing system, ie. the sensor switches (100a, 100b) and/or linear actuators (110a, 110b) are non-functioning. Furthermore, the "NEUTRAL" mode will cause the rods (112a, 112b) of both linear actuators (110a, 110b) to be retracted so the arrangement will have no effect on the original workings/operation of the support assembly 20A.

A second mode of operation (Mode II) is one in which the controller module Ci is configured with the necessary control instructions to operate the linear actuators (110a, 110b) substantially automatically or autonomously such that direct manual operation is not required by a human operator. In Mode II the arrangement can be left to operate so that any misalignment of the moving belt 10 is automatically corrected once any 'belt drift' is detected by the switch modules 100a, 100b. When in Mode II, the controller module Ci can be configured operable so as to manage or facilitate the following in a substantially autonomous manner:

(i) resisting further movement of the conveyor belt 10 in the transverse direction; and/or (ii) biasing the conveyor belt 10 to or toward an alignment of the belt prior to she position or movement being sensed; and/or (iii) restoring alignment of the conveyor belt 10 to one substantially in accordance with general operation of the conveyor assembly; and/or (iv) taking no action in respect of the conveyor belt 10.

Thus, Mode II (automatic mode) utilises the two switch modules 100a, 100b (also referred to as belt drift switches) of the arrangement to make automatic adjustments to the support frame 20A (ie. tracking frame) so as to bring rollers 202a, 202b, 90a, 90b, 90c (which ever as the case may require) into engagement with portions/regions of the belt 10. In one aspect, Mode II is best suited to the return tracking frame (discussed below) before the conveyor tail pulley and the belt drift switches set just after the loading zone. The switch modules 100a, 100b will pick up any belt drift ($L_{Drift}$) caused by, for example, the loading zone and make adjustments to the tracking frame before the loading zone. The switch modules 100a, 100b can be integrated into operator interface programs/software to show an appropriate indication/warning when the arrangement is making an adjustment or is activated/operational.

As noted above, when in automatic mode (ie. Mode II), retraction of a linear actuator s rod when the alternate extends, occurs automatically; For example, if the "TRACK LEFT" function is operable, one linear actuator extends and the other retracts; if the "TRACK RIGHT" is operable, the opposite occurs.

Figure 13:
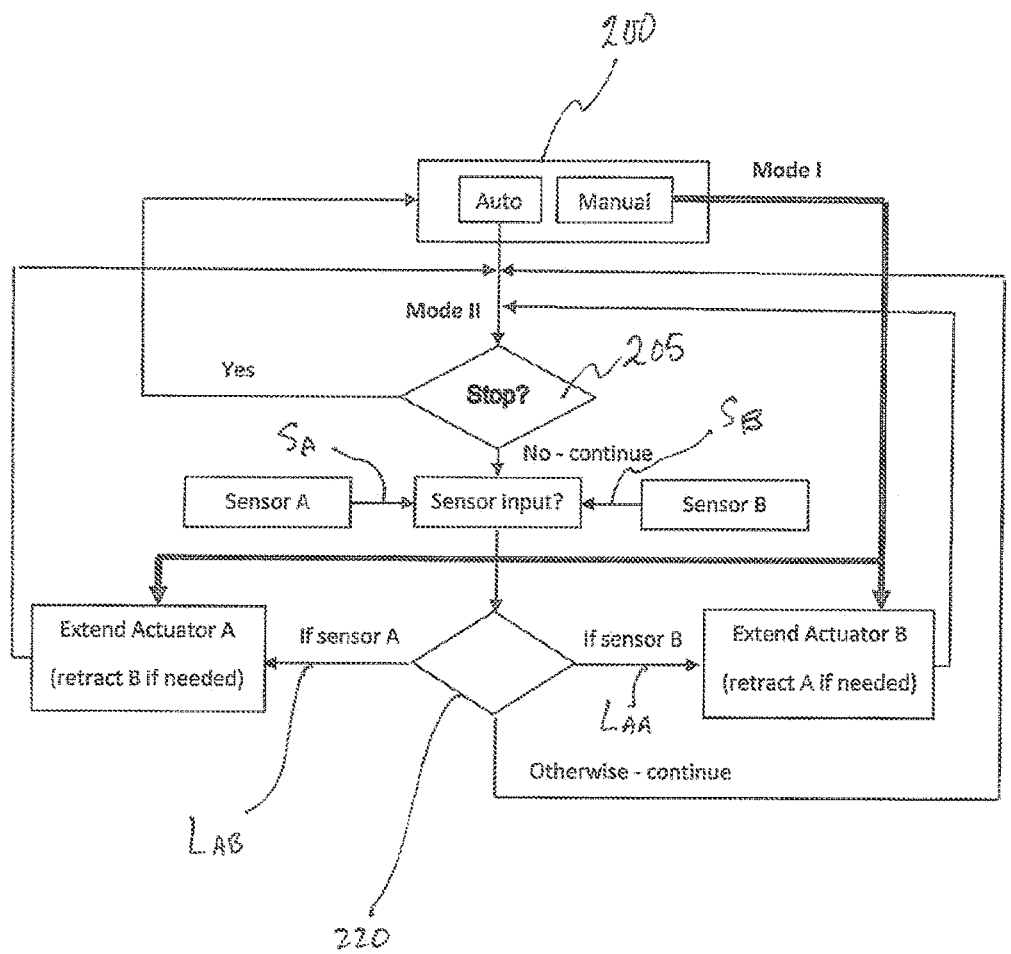
FIG. 13 shows a schematic flow diagram of the operation of the embodiment of the arrangement described herein.

FIG. 13 shows one embodiment of a schematic flow diagram illustrating one possible operation of the arrangement, including both Mode I and Mode II operations for the 'carry' support assembly 20A. Control box $200_1$ comprises hardware configured for initiating at least Modes I and II by physical means (eg. by way of a key-switch $K_S$). It will be appreciated that substantially the same functionality is provided for the 'return' support assembly 20C and housed in control box $200_2$ (discussed below).

On selection of Mode II, unless otherwise instructed (for example, by determination at stage 205), the controller module Ci progresses to a stage 210 where a determination is sought as to whether an input signal ($S_A$, $S_B$) has been received from one of the switch modules 100a, 100b. If an input signal has been received controller module $C_1$ operates (by way of sending signals $L_{AA}$, $L_{AB}$ as appropriate) the appropriate linear actuator (110a, $110_b$) for moving the base member 130 of the support assembly 20A so as to move the appropriate rollers 202a, 202b, 90a, 90c against the relevant adjacent edge of the belt 10 to adjust or modify its alignment. Depending on the situation, a retraction of the rod (112a, 112b) of the alternate linear actuator may need to occur as well in order to mitigate against possible interference. Otherwise, the algorithm continues, in essence, waiting for an input from one of the switch modules 100a, 100b, at an intervention (by way of the key-switch $K_S$, for example) to return the arrangement to the manual mode.

It will be appreciated that similar functionality as described above is applicable to the operation/function of the arrangement used with the support assembly 20C (by way of interface hardware provided with control box $200_2$—see FIGS. 22A, 22B).

The controller module $C_1$ (and indeed, controller module $C_2$ operable with the support assembly 20C for use with the 'return' section (12) of the belt 10) may comprise a processor module $C_P$ (see FIGS. 12A and 12B) configured so as to control the operation of the switch modules (100a, 100b) and actuator modules (110a, 110b) to provide (or coordinate) the capability as outlined herein. Programming of the processor module $C_P$ for carrying out any of the functions tasks can be implemented in any appropriate manner. The processor module $C_P$ may be configured so as to be capable of receiving one or more signals (for example, from an electronic device (portable of otherwise, and which could be operable by way of a user or having been suitably programmed oy a user) such as a control station, a tablet device, mobile phone, remote transmitting device and the like device associated with the conveyor belt assembly, related system, or network).

A signal could also be transmitted by the electronic device causing or implementing any type of operational event to occur. Thus, the processor module $C_P$ could be operable with a communication module (not shown) so that control signals/commands can be received from the electronic device. Such an electronic device could communicate with the processor module $C_P$ using sufficiently equipped near field communication (NFC). Any other wireless protocol could also be used.

The processor module $C_P$ may be configured for controlling or managing all operations at the arrangement during use, independently or with input from the electronic device. The processor module $C_P$ may compose a processor which could include one or more cores that may enhance speed and performance of a multiprocessor. In some embodiments, such a processor may be a dual core processor, quad core processors, other chip-level multiprocessor and the like that combine two or more independent cores.

The operations conducted by the processor module $C_P$ may be by way of an appropriate computing system including one or more computing devices (networked or otherwise). In particular, the methods/processes described herein may be implemented as a computer application, computer service, computer API, computer library, and/or other computer program product. Any such computing system could include a logic subsystem and a data-holding subsystem. The computing system may optionally include a display subsystem, communication subsystem, and/or other components. Such a computing system may also optionally include user input devices such as keyboards, mice, game controllers, cameras, microphones, and/or touch screens, for example. One or more logic subsystems may include one or more physical devices configured to execute one or more instructions. For example, any such logic subsystem may be configured to execute one or more instructions that are part of one or more applications, services, programs, routines, libraries, objects, components, data structures, or other logical constructs that could be operated by the electronic device and or the processor module $C_P$. Such instructions may be implemented to perform a task, implement a data type, transform the state of one or more on-board devices (of the host vehicle), or otherwise arrive at a desired result.

The logic subsystem may include one or more processors that are configured to execute software instructions. Additionally or alternatively, the logic subsystem may include one or more hardware or firmware logic machines configured to execute hardware or firmware instructions. Processors of the logic subsystem may be single core or multicore, and the programs executed thereon may be configured for parallel or distributed processing. The logic subsystem may optionally include individual components that are distributed throughout two or more on-board devices, which may be remotely located and/or configured for coordinated processing. One or more aspects of the logic subsystem may be virtualized and executed by remotely accessible networked computing devices configured in a cloud computing configuration.

The processor module $C_P$ may comprise various forms of data-holding systems for the storage of relevant and/or software instructions. Such data-holding systems (and/or related subsystems) may include one or more physical, non-transitory, devices configured to hold data and/or instructions executable by the logic subsystem to implement embodiments of the methods/processes described herein.

Data-holding subsystems may include removable media and/or built-in devices. Data-holding subsystems may include optical memory devices (e.g., CD, DVD, HD-DVD, Blu-Ray Disc, etc.), semiconductor memory devices (e.g., RAM, EPROM, EEPROM, etc.) and/or magnetic memory devices (e.g., hard disk drive, floppy disk drive, tape drive, MRAM, etc.), among others Data-holding subsystems may include devices with one or more of the following characteristics: volatile, nonvolatile, dynamic, static, read/write, readonly, random access, sequential access, location addressable, file addressable, and content addressable. In some embodiments, logic subsystems and data-holding subsystems may be integrated into one or more common devices, such as an application specific integrated circuit or a system on a chip.

Software or program instructions operated by the processor module $C_P$ may be associated (directly or indirectly) with a client (operable, for example, for transferring instructions to the processor module $C_P$) that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs or codes as described herein and elsewhere may be executed by the client. In addition, other devices required for execution of methods as described in this application may be considered as a part of the infrastructure associated with the client. The client may provide an interface to other devices including, without limitation, servers, cloud servers, other clients, printers, database servers, print servers, file servers, communication servers, distributed servers and the like. Additionally, this coupling and/or connection may facilitate remote execution of one or more programs across the network. The networking of some or aft of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In such implementations, remote repositories may act as a storage medium for program code, instructions, and programs.

In one example implementation, a conveyor belt assembly could be configured with a plurality of support or tracking frames fitted with the componentry of the embodiment of the arrangement described herein. The controller module's (C) of each of the arrangements could be configured with appropriate communication module(s) so as to communicate information to an overarching control system that is remote from the conveyor belt assembly. Such communication could be facilitated across a network or similar architecture (such as for example, when operating a number of conveyor belt assemblies). Such information communication to the overarching control system may include any information which describes the current status or operational condition of a relevant arrangement. For example, such information could include the mode of operation the arrangement is currently in (whether it is Mode I or Mode II), whether one or both switch modules (100a, 100b) have been triggered, the nature of any corrective action taken (or proposed to be taken). Such information could also include historical data which describes the operation of the arrangement over a desired period of time. Any of such information could be used to form the basis of any action, alarm, or warning that may be processed by the overarching control system for the purposes of taking one or more responsive actions (corrective or otherwise) in respect of the conveyor belt assembly.

Communication between the overarching control system and one or more of the arrangements (on, for example, 'carry' and 'return' sections of the relevant belt) as used with embodiments 2 of the conveyor belt assembly 5 may include bi-direction communication, allowing operational instructions to be sent from the overarching control system to each of the arrangements as may be needed. In this manner, direct (remote) control of the arrangements could be facilitated at least in part by appropriate configuration of the respective controller modules (C) of each respective arrangement.

The materials used in the construction of the conveyor belt assembly 5 for present purposes are not beyond those that the skilled reader would be aware of as being used in existing conveyor arrangements. Structural grade steels would be readily used for the forming of appropriate support assemblies, whereby, corrosion resistance properties would be favoured depending on the environment in which the conveyor belt assembly is operating within.

Roller assemblies would be well known to the skilled reader, as would drive units/arrangements used to drive the conveyor belt 10.

The switch modules 100a, 100b (and 100c, 100d discussed below) may each comprise, (or example, a Safe-T-Drift® Heavy Duty Belt Misalignment Switch, and the linear actuators 110a, 110b (and 360a, 360b discussed below) may each comprise, for example, a SKF SOON CAHB-10 Electric Linear Actuator powered by a 24 volt DC source, and having a 200 mm stroke length.

Embodiments of the arrangement attach or connect to a tracking frame (20A) or supporting structure by a damping/mounting/connecting arrangement. When (the arrangement) is installed the tracking frame assembly (20A) can be operated/monitored, and or can be remotely operated/monitored.

Embodiments of the arrangement may comprise two 24 Volt direct current (DC) ball and screw type linear actuators (110a, 110b, 360a, 360b discussed below) which interact with respective reaction plates (115a, 115b (and indeed reaction plates 350a, 350b as will be discussed below)) which are mounted to the tracking frame assembly (20A) in a manner which causes movement of the tracking frame assembly in a direction opposite to the direction of the extension of the rod/screws of the actuators (due to the pivoting nature of the tracking frame assembly 20A). In the form shown, the linear actuators (110a, 110b) are wired to the control box (200) that a user can interface with to drive the actuators thereby, in turn, driving the movement of (so as to steer, for example) the tracking frame assembly (20A) in the desired orientations so as to have the desired effect on the conveyor belt (10) alignment.

As noted, the linear actuators (110a, 110b) can be controlled by way of an automatic mode of operation whereby drift of the belt (10) can be sensed by one or more sets of two proximity or limit switches (100a, 100b) which sense belt (10) misalignment and will feed back the necessary information allowing the controller module $C_1$ to drive the linear actuators (110a, 110b) in a way so as to steer the support frame assembly (20A) so as to correct the belt (10) misalignment.

As also described, the linear actuators (110a, 110b) and proximity or limit switches 100a, 100b) can be communicatively linked to a mine site control system software, such as for example, Citect or similar, to give the mine site controller information regarding the orientation of any tracking frame (which embodies the principles of the arrangement described herein) and the activation (or otherwise) of either proximity or limn switches (100a, 100b). Such communication arrangement could, as noted, confer operational control, or aspects of it, to or via relevant mine site control system software(s).

Embodiments of the arrangement described herein can be configured so that the arrangement can be retrofitted to an existing supporting or tracking frame of any existing conveyor belt assembly. In such embodiments, the sensor/limit modules 100a, 100b), actuator modules (110a, 110b), and or reaction plates (115a, 115b). and or respective mounting, connecting, damping arrangements, are installable (in a releasable manner or otherwise, ie. temporary or permanent) on existing supporting assembles, tracking frame or tracking frame assemblies, or other structure supporting the conveyor belt assembly, in the appropriate locations.

Figure 14:
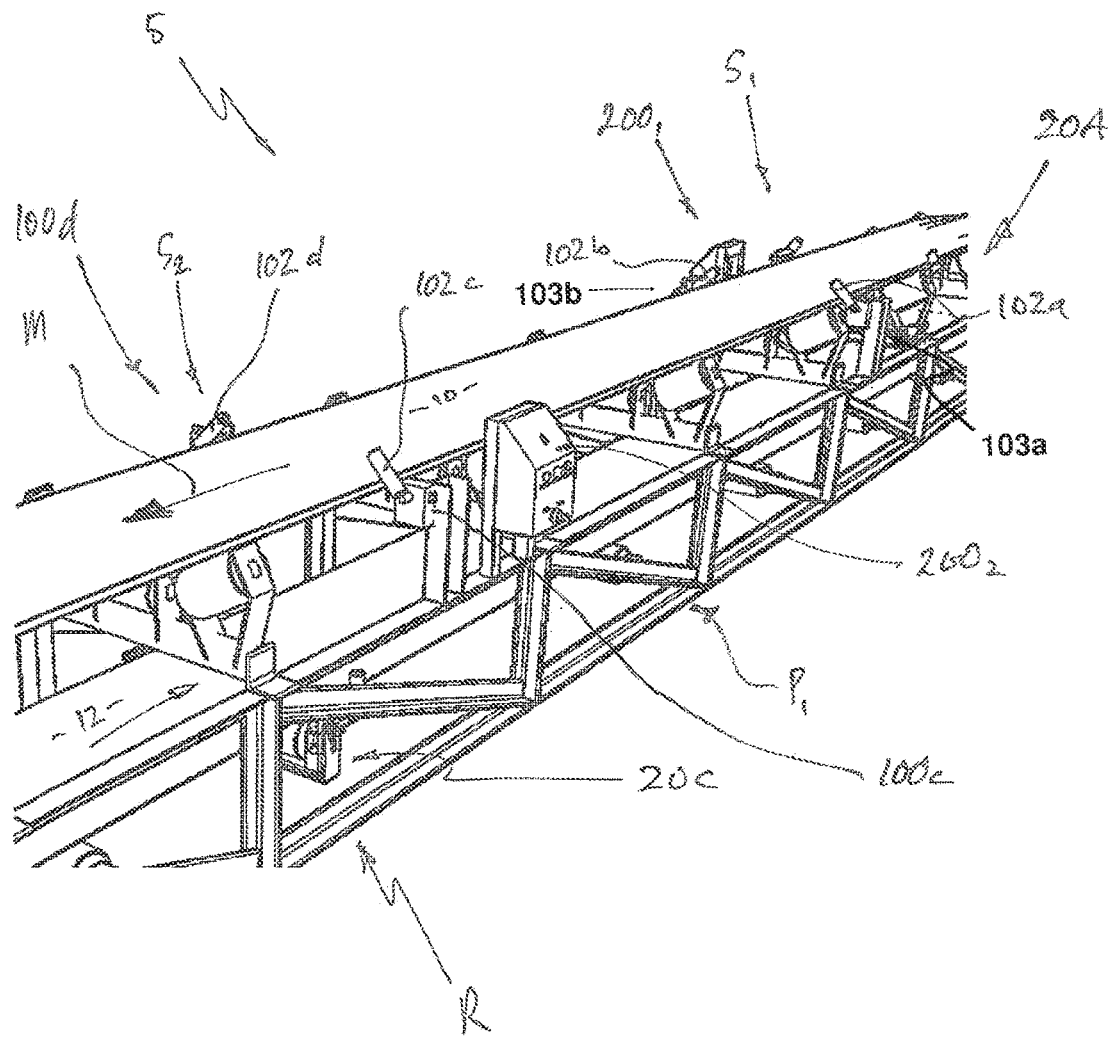
FIG. 14 shows another perspective view of the convey belt assembly shown in FIG. 1.

As noted above, the locations of the actuator modules (110a, 110b) and the reaction plates (115a, 115b) can be reversed in an arrangement in which the reaction plates are held supported instead by the rotatable/pivotable frame assembly supporting one or more rollers in or capable of being in rolling engagement with the belt 10, and the actuator modules are held stationary (relative to the general conveyor belt assembly) by supporting structure; urging of the rod/screws of the actuator modules against respective reaction plates serves to cause a rotation or pivoting of the frame assembly so as to steer the belt as needed. In substance, this is the general configuration (and associated operation) of the further support assembly 20C configured for operable use with the 'return' section 12 of the belt 10. In the context of the present embodiment, FIG. 14 shows the general location of support assembly 20C as shown at location R (as is also shown in FIG. 1).

Figure 15A:
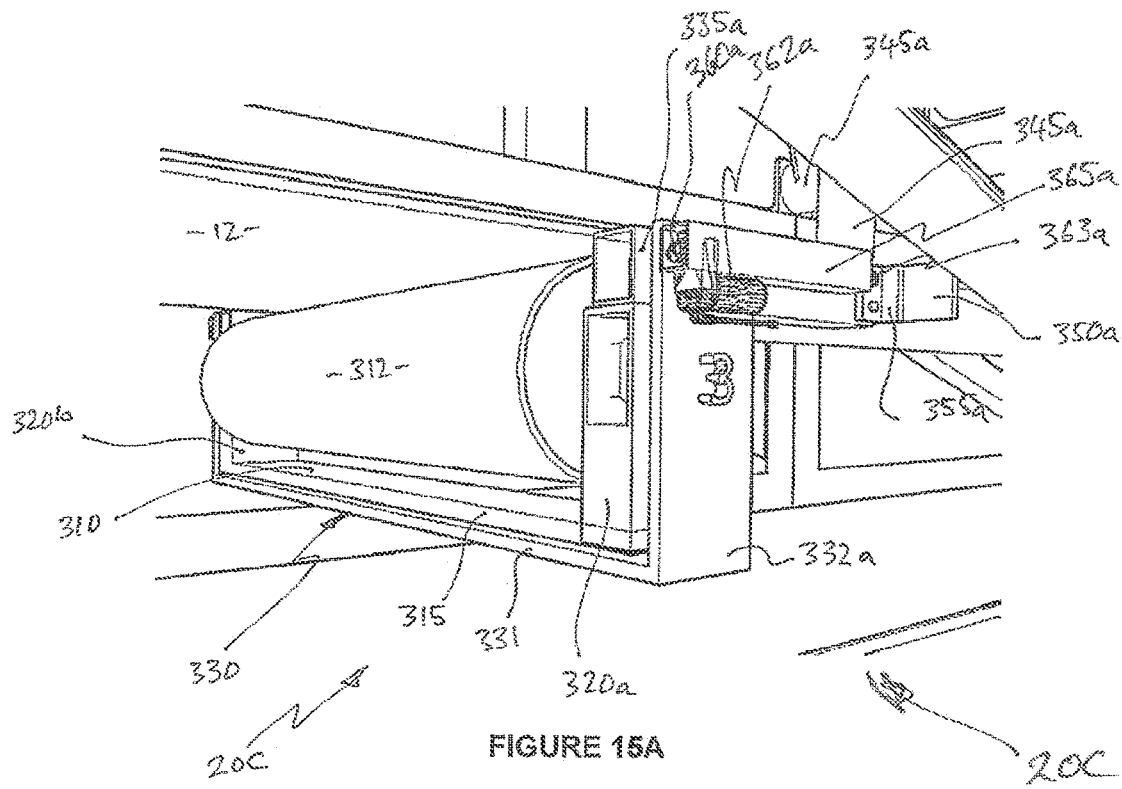
FIG. 15A shows a perspective view of one embodiment of an arrangement configured in accordance with the principles described herein, and provided on the 'return' section of the conveyor belt assembly shown in FIG. 1)
Figure 15B:
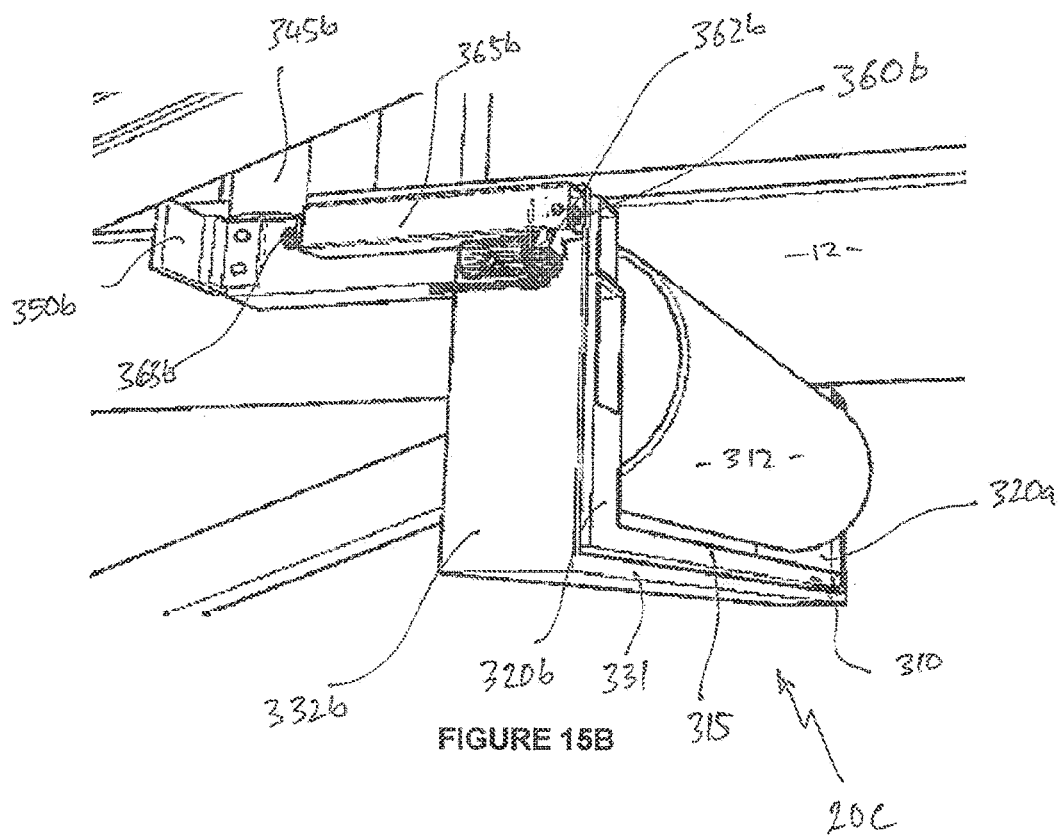
FIG. 15B shows another perspective view of the embodiment of the arrangement shown in FIG. 15A, but from the alternate side of the conveyor assembly.
Figure 16:
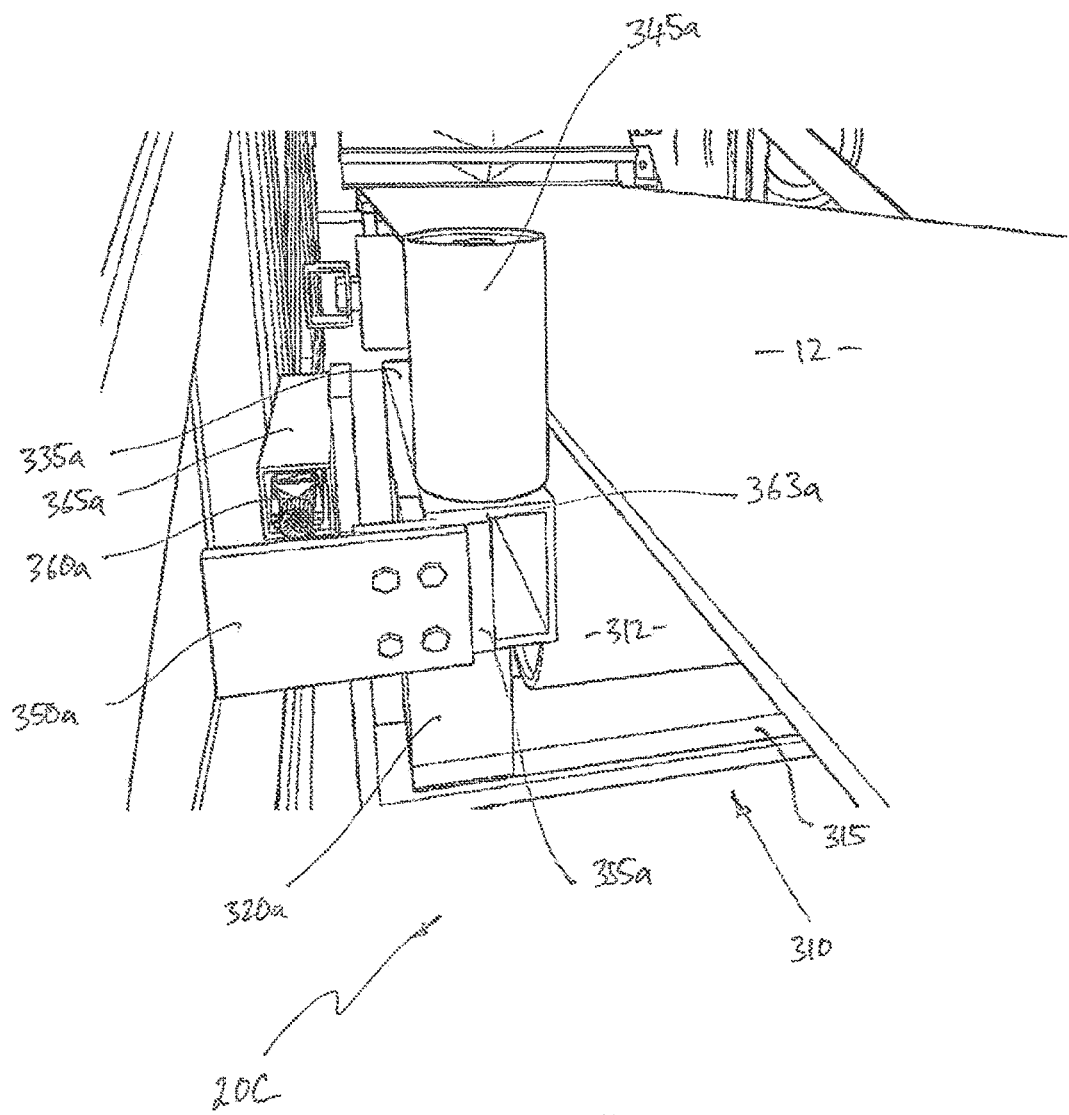
FIG. 16 shows another perspective view of the embodiment of the arrangement shown in FIG. 15A/B.
Figure 17:
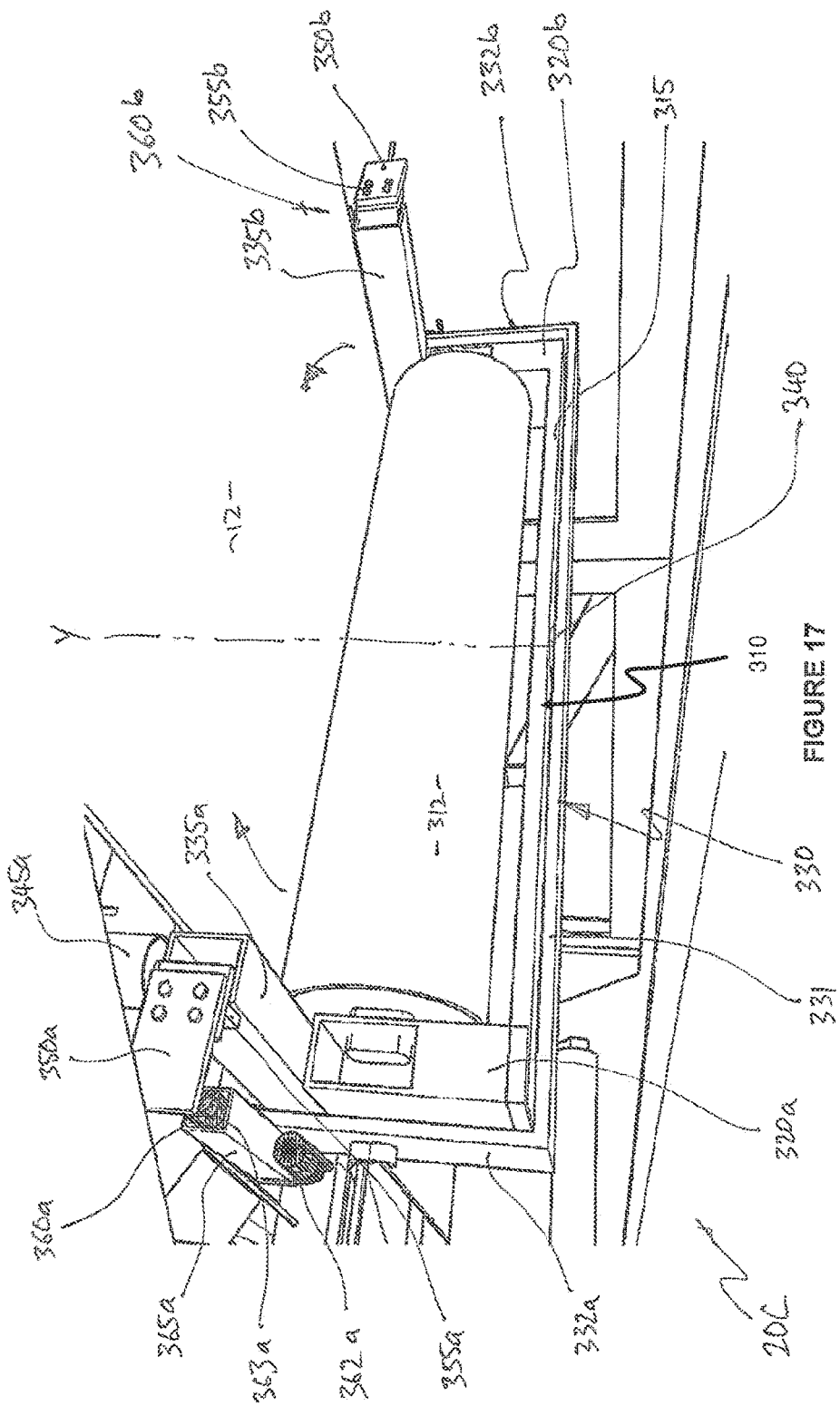
FIG. 17 shows another perspective view of the embodiment of the arrangement shown in FIG. 15A/B.

FIGS. 15A, 158 through to FIG. 17 show various (perspective) views of the general configuration of support assembly 20C operable with the 'return' section (12) of the belt 10. In essence, the support assembly 20C is operable by way of linear actuators 360a, 360b based on sensory input received from sensor modules 102c, 102d of respective switch modules 100c, 100d (see FIG. 14 and FIGS. 22A, 22B)—whereby the relevant control electronics are housed in control box $200_2$. The support assembly 20C comprises a bracket assembly 310 having a base member 315 and upright members 320a, 320b provided/connected at opposite ends of the base member as shown. Upright members 320a, 320b are configured so as to rotatably support roller 312 by way of a suitable axle assembly in substantially the same manner as described above with respect to the rollers of the frame assemblies 20A/B. As shown in at least FIG. 16, each of the upright members 320a, 320b each support (at their upper regions) respective tube sections 335a, 335b (square tube sections are shown) aligned substantially horizontally and which support respective rollers 345a, 345b out from the bracket assembly 310. Each of the tube sections 335a, 335b are engineered/assembled so that each of the rollers 345a, 345b are spaced (at a distal region of the respective tube section) from respective edges of the 'return' section (12) of the belt 10. Consistent with the principles described above with respect to the support assembly 20A, support of the edge rollers 345a, 345b is arranged such that either are capable of engaging with respective portions/regions of the 'return' section (12) of the belt 10 during operation as may be required for adjusting (such as for example, by way of steering by way of rotational/pivoting movement of the support assembly 20C) the alignment of the belt. The tube sections 335a, 335b also support, at their distal ends, respective reaction plates 350a, 350b (which can be urged against by way of the rod/screw elements of respective actuator modules (360a/b) supported by structure supported by the parallel frames assemblies $P_1$, $P_2$, as will be discussed below). Support of the reactions plates 350a, 350b is by way of a mounting bracket/fastening assembly 355a, 355b (see FIG. 18).

The bracket assembly 310 is rotatably or pivotably supported by a further bracket assembly 330 which spans across between the two parallel frame assemblies $P_1$, $P_2$. Bracket assembly 330 also comprises a base 331 and upright members 332a, 332b at its free ends. In essence, bracket assembly 330 is engineered having a shape and form in keeping with that of bracket assembly 310, but sized larger so that bracket assembly 310 can rotate/pivot within the general envelope/profile of the bracket assembly 330 without undue interference. Bracket assembly 310 is rotatably or pivotably supported by bracket assembly 330 by way of a bearing assembly 340 (see FIG. 17) so that bracket assembly 310 can pivot relative to (and within the structure of) bracket assembly 330 about an axis Y in a similar manner as does the support member 130 of the support frame assembly 20A.

Uptight members 332a, 332b of the bracket assembly 330 each support respective ball screw type linear actuators 360a, 360b, by way of tube sections 365a, 365b (square tube sections shown). Tube sections 365a, 365b are connected to respective upright members 332a, 332b using any suitable means such as for example, welding, fasteners etc. Linear actuators 360a, 360b each comprise respective motors 362a, 362b (housed by respective tube sections 365a, 365b) and rod/screw elements 363a, 363b and operate in the same manner as described above.

As noted, the same relative movements between the linear actuators 360a, 360b and the corresponding reaction plates 350a, 350b during operation of the support assembly 20C exist as described above in relation to the support assembly 20A. As discussed at length above, sensor input from the sensor modules 102c, 102d (shown in FIG. 14, and FIGS. 22A and 22B) is used by a controller (all the relevant electronics associated with the 'return' section (12) support assembly 20C are housed in control box $200_2$) to operate the linear actuators 360a, 360b as required. In the embodiment shown, control box $200_2$ and related control electronics (such as that shown in FIGS. 11A and 11B) is operable with the linear actuators 360a, 360b offering the same control options as has been described above, so that the support assembly 20C can be operated appropriately.

Broadly, in the event of the sensing assembly sensing a misalignment of the belt 10 (occurring as described above, ie. using the belt drift sensors 102c, 102d), linear actuators 360a, 360b are operated so as to extend their respective rod/screw element 363a, 363b (whichever is relevant) so as its tip contacts the respective reaction plate (350a, 350b) and for urging there against. By way of the bracket assembly 310 of support assembly 20C being rotatable or pivotable relative to bracket assembly 330, bracket assembly 310 is able to pivot, or be pushed as needed (see arrows of rotation/pivot shown in FIG. 17) thereby steering the 'return' section (12) of the conveyor belt 10 by way of engagement occurring between rollers 345a, 345b with corresponding portions/regions of the edge of the belt 10 (of the 'return' section). As with the support assembly 20A, retraction of respective linear actuator (360a, 360b) rod/screws is automatic so as to avoid any undue interference.

In practice, the support assembly 20C may be fabricated and or assembled offsite and located in the appropriate position on the conveyor belt assembly 5 (at the return section of the belt 10). In this manner, little or no modification needs to be made to existing tracking frame assemblies (on the return side of the belt 10).

Figure 18:
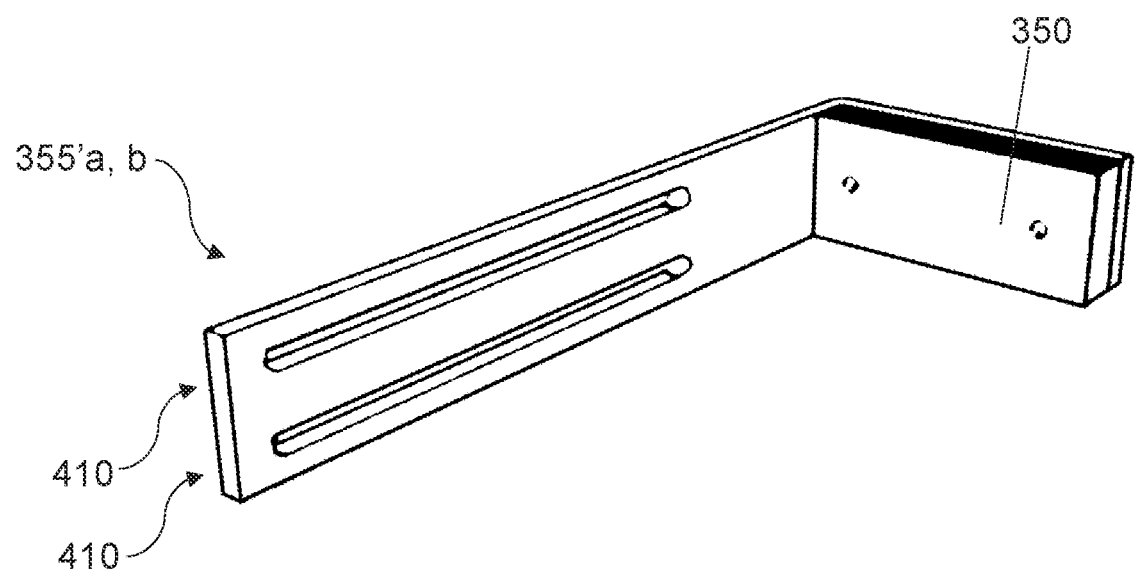
FIG. 18 shows a perspective view of one embodiment of a mount/bracket assembly used in accordance with an embodiment of the arrangement described herein.
Figure 19:
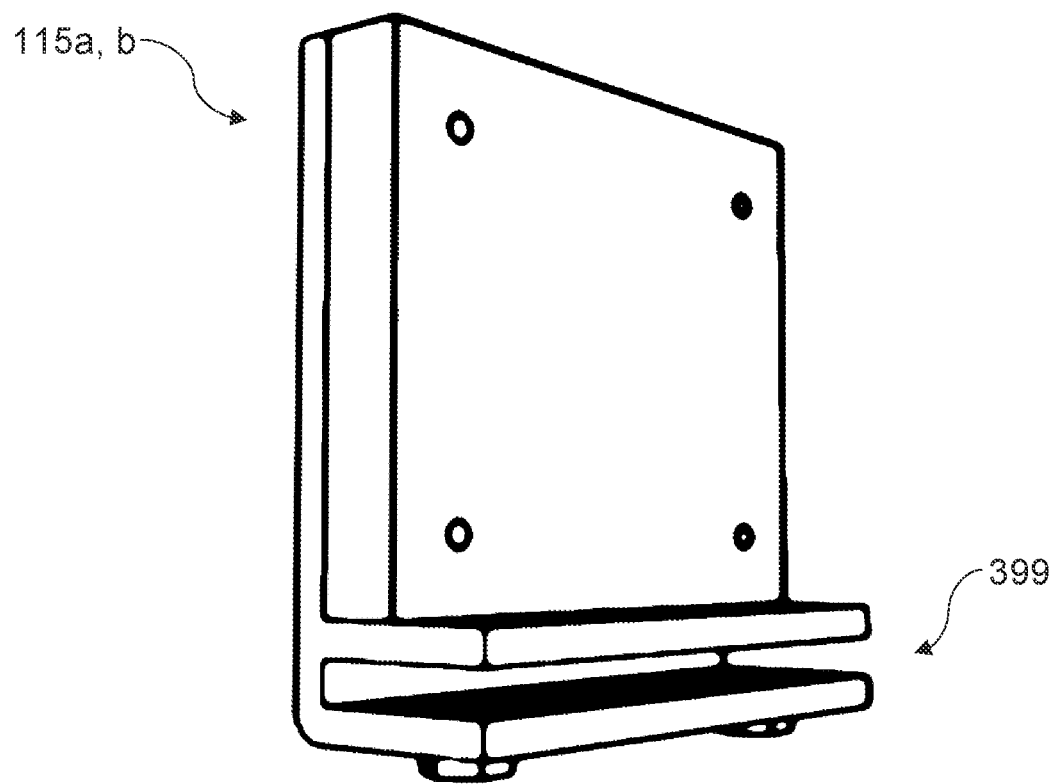
FIG. 19 shows a perspective view of a further embodiment of a mount/bracket assembly used in accordance with an embodiment of the arrangement described herein.
Figure 20:
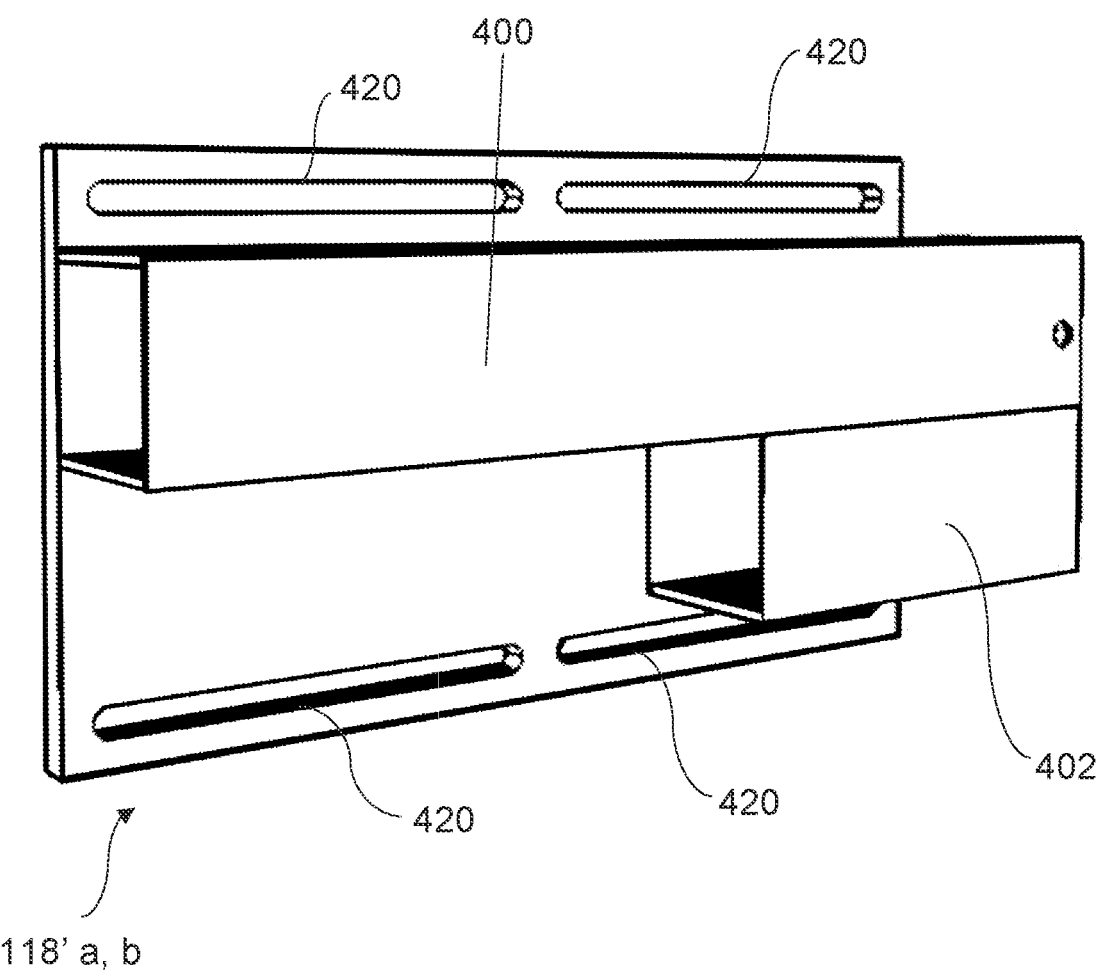
FIG. 20 shows a perspective view of another embodiment of a mount/bracket assembly used in accordance with an embodiment of the arrangement described herein.

It will be appreciated that the bracket and mounting assemblies supporting the sensing assemblies, actuator assemblies to relevant structure can be engineered as appropriate without departing from the general principles of the arrangement described heroin and shown in the Figures. Furthermore, similar also applies to the engineering and fabrication of the bracket assemblies 310, 330 (of support assembly 20C). While FIGS. 1 to 17 show mounting and damping arrangements operable for use in connecting the sensing modules and linear actuators to the respective components of the conveyor belt assembly, other embodiments are possible. For example, FIG. 19 shows another embodiment of a reaction plate assembly (comprising reaction or stop elements 115a/b) suitable for use for connecting to cross members 135a, 135b of the support structure 135 (grooved or spaced region 399 engineered so as to receive or accommodate an edge portion of cross member 135a and securable therewith using one or more fasteners); FIG. 18 shows another embodiment 355'a/b of a mounting bracket/fastening assembly 355a, 355b operable for supporting respective reaction plates 350a, 350b (elongate apertures 410 being engineered to allow the assembly to be clamped or fastened in position accordingly); and FIG. 20 shows an embodiment 118'a/b of mounting bracket/fastening assembly suitable for hosting or supporting a linear actuator (110a, 110b, 360a, 360b) akin to the engineered tube sections 118a, 118b—in which tube section 400 houses the rod/screw component of the linear actuator, and tube section 402 houses the motor component (elongate apertures 420 being engineered to allow the assembly to be clamped or fastened in position accordingly). The skilled reader would appreciate that various equivalent arrangements configurations could be possible.

Following from the above, commercial forms of the embodiments based on the principles of the arrangement as described herein, may include kits that comprise the relevant components allowing forms of the arrangement to be installed on existing support and tracking frame assemblies. The skilled reader would appreciate that such kits could take many different forms, providing different combinations of components, depending on operator/user needs. In this regard, some forms of such kits may not comprise certain components if such components can be sourced (by the purchaser) from alternate sources. Accordingly, the scope of how such kits can be comprised could differ depending on a purchasers needs.

As will be readily understood by the skilled reader, in the context provided herein, a significant market is the mining industry as it is one of the biggest users of conveyor belts utilising tracking frames. Such conveyor belt system are used in extreme conditions and tend to incur high costs a result of equipment downtime, also with high standard safety systems in place. Embodiments of the arrangement can be readily integrated or retrofitted onto the pre-existing tracking frame assemblies allowing embodiments of the arrangement to be applied to any other industry that utilize conveyor belt systems that feature tracking frame assemblies.

Advantageously, embodiments of the arrangement seek to avoid the need to use ropes and manual handling practices to correct conveyor belt alignment, and/or to eliminate the need for isolation to free a tracking frame when it becomes seized from product and to allow the remote sensing of tracking issues up stream of a tracking frame, functionality that is not able to be achieved at the moment.

Accordingly, embodiments employing the principles of the arrangement described herein may serve to provide one or more of the following advantages as compared to existing systems:

- In existing systems, the reaction arm roller is subject to failure rendering the tracking frame useless;
- In existing systems, the reaction arm and roller are fitted locally to the tracking frame but the tracking frame is only able to correct the path of the conveyor belt down stream of its position. The presently described principles provide a means of sensing conveyor belt drift down stream of the tracking frame via means of one or more sensors configured for sending the position of the belt (such as for example, proximity sensors or switches which are triggered when contact is detected with an edge portion or region of the belt);
- In existing systems, tying up a tracking frame with a rope is a common practice to bias the conveyor belt back to centre even when the reaction arms and rollers are fitted and working. This is often done while the conveyor belt is running and is a dangerous practice as the person is in close proximity to rotating equipment;
- In existing systems, tracking frames can be overcome with spill product seizing the pivoting motion of the frame. It is common practice to manually rock the tracking frame from side to side to free up the tracking frame, this is often done while the conveyor is running again putting people close to rotating equipment
- Having tracking frames integrated into the mine site control software provides the advantage of being able to alert mine site controllers of the nature of the conveyor belt tracking. Furthermore, historical data can be kept and compared to diagnose transfer chute health and potential blocked chutes.

Advantageously, embodiments employing the principles of the arrangement described herein also seek to increase safety for at least the following reasons:

- There is no need for isolation for the purposes of making tracking frame assembly adjustments, thereby seeking to remove any perceived pressure there was before to do corrective works while the conveyor belt assembly is online.
- Following from the above, embodiments may see an increase in production and operational availability.
- Less spillage from a conveyor belt assembly means less dropped object hazards and less manual handling hazards associated with cleaning up the spillage.

Embodiments employing the principles of the arrangement described herein may seek to increase production because of at least the following:

- There is no need for equipment downtime to make manual adjustments to the tracking frame assembly.
- Correct tracking of the conveyor belt lessens the wear on the conveyor assembly and related structural components.
- The remote switches will activate an alarm on interface software before the belt shuts down on the already in place belt drift switches, giving an operator time to check the reason for belt drift during continuous operation.
- Reduced operational disruption. When conveyor belts shut down there is a disruption in both directions, and targets for stockpile capacities during operation is affected. Also, delivery to the plant operation for pit operations is suspended until the reason and time frame is determined, often creating a requirement for trucks and mobile machinery to be redirected to alternative requirements. The end result is a failure to meet production planning key performance indicators (KPI's).

Other variations in sensing the position or movement of the conveyor belt may be possible and are to be included within the scope of the principles described herein. For example, in one possible arrangement, the sensor modules comprise one or more proximity switches, image capture devices (such as for example, cameras) arranged so as to capture/record images of the belt. In one form, static or moving images may be captured. In one arrangement, one or more of the static or video images may be processed (by way of, for example, image processing techniques) so as to determine a position and/or movement of the belt. The skilled reader would appreciate that information/data from such image capture devices could be readily communicated to an overarching controller for use in assisting in the monitoring/management of the relevant tracking frame and associated conveyor belt. Of course, such information/data could serve as an input for software or programming instructions directed to conferring autonomous control/operation of the tracking frames (and indeed, the or reach relevant conveyor belt assembly). In this manner, one or more conveyor belt assemblies could be monitored/controlled and/or operated (manually or otherwise) from a centralized location, whether this location be local to one of the conveyor belt assemblies, or remote from all of the conveyor belt assemblies.

What is claimed:

1. An arrangement for use with a tracking frame assembly for maintaining alignment of a conveyor belt of a conveyor belt assembly supported by a stationary support structure, the arrangement comprising:
   a sensing assembly connectable with a region of the support structure so as to be spaced from a portion or region of an edge of the conveyor belt, the sensing assembly configured operable for sensing a position or movement of the conveyor belt during operation, and
   an actuator assembly arranged operable between the tracking frame assembly and the support structure, the actuator assembly configured operable for selective engagement with a reaction assembly thereby allowing selective urging against the reaction assembly so as to modify a position, alignment, or orientation of a portion or region of the tracking frame assembly for correcting an alignment of the conveyor belt based on, at least in part, said sensed position or movement of the conveyor belt.

2. An arrangement according to claim 1, wherein the conveyer belt assembly is permanently positioned.

3. An arrangement according to claim 1, wherein the tracking frame assembly applies tracking to a 'carry' section of the conveyor belt.

4. An arrangement according to claim 1, wherein the tracking frame assembly is configured with the support structure so as to be provided with freedom to rotate about an axis that is substantially orthogonal to the conveyor belt assembly and substantially central to a width of the conveyor belt assembly, the rotation of the tracking frame assembly causing engagement of same with the moving conveyor belt for countering and/or correcting an alignment of said belt.

5. An arrangement according to claim 1, wherein the actuator and reaction assemblies are configured operable for adjusting or modifying a position, alignment, or orientation of the tracking frame assembly so that one or more rollers supported by the tracking frame assembly engage with the moving conveyor belt in the correcting of an alignment of the conveyor belt based on, at least in part, said sensed position or movement of the conveyor belt.

6. An arrangement according to claim 1, wherein the sensing assembly comprises a pair of sensor modules, each sensor module supported by the support structure so as to be spaced from respective edges of the conveyor belt in a substantially symmetric manner about a length of the conveyor belt assembly.

7. An arrangement according to claim 1, wherein the actuator assembly comprises first and second actuator modules connectable with either of the tracking frame assembly or the support structure, each first, second actuator module supported in a substantially symmetric manner about the relevant one of the tracking frame assembly or the support structure.

8. An arrangement according to claim 7, wherein the reaction assembly comprises first and second reaction elements connectable with either of the tracking frame assembly or the support structure, each reaction element supported in a substantially symmetric manner about the relevant one of the tracking frame assembly or the support structure.

9. An arrangement according to claim 8, wherein the first and second reaction elements are arranged in proximity with the first, second actuator modules respectively for allowing selective urging there against by respective first, second actuator modules for selective steering of the tracking frame assembly in the adjustment of the alignment of the conveyor belt.

10. An arrangement according to claim 9, wherein the first and second reaction elements are connected with respective regions of the support structure, and the first, second actuator modules are connected with respective regions of the tracking frame assembly.

11. An arrangement according to claim 9, wherein the first and second reaction elements are retrofitted with respective regions of the support structure, and the first, second actuator modules are retrofitted with respective regions of the tracking frame assembly.

12. An arrangement according to claim 9, wherein the first and second reaction elements are connectable with respective regions of the tracking frame assembly, and the first, second actuator modules are connected with respective regions of the support structure.

13. An arrangement according to claim 9, wherein the first and second reaction elements are retrofitted with respective regions of the tracking frame assembly, and the first, second actuator modules are retrofitted with respective regions of the support structure.

14. An arrangement according to claim 1, wherein the sensing assembly is spaced from the actuator assembly along a length of the conveyor belt.

15. An arrangement according to claim 1, wherein the sensing assembly is spaced either upstream or downstream from the actuator assembly relative to a running direction of the conveyor belt.

16. An arrangement according to claim 6, wherein one or both of the pair of sensor modules comprise any of a proximity sensor or switch, a limit sensor or switch, a drift sensor or switch.

17. An arrangement according to claim 7, wherein each of the first and second actuator modules comprise a linear actuator having a rod or screw element operable between a retracted condition or position and an extended condition or position for the selective engagement with the reaction assembly thereby allowing selective urging against the reaction assembly.

18. An arrangement according to claim 7, further comprising a controller module configured in operable association with the sensing assembly and actuating assembly, the controller module configured operable for facilitating or enabling a first mode of operation of the first or second actuator modules for steering of the tracking frame assembly, and for facilitating or enabling a second mode of operation in which steering of the tracking frame assembly is conducted in a substantially manual manner.

19. An arrangement according to claim 18, wherein the controller module is configured so as to enable or facilitate the following operations in either or both of the first and or second modes of operation:
  (i) resist further movement of the conveyor belt in a transverse direction of the conveyor belt;
  (ii) bias the conveyor belt to or toward an alignment of the conveyor belt prior to said position or movement being sensed;
  (iii) restore alignment of the conveyor belt to one substantially in accordance with general operation of the conveyor belt assembly;
  (iv) take no action in respect of the conveyor belt.

20. A method for managing, at least in part, alignment of a moving conveyor belt by way of adjustment of a tracking frame assembly supported by a stationary support structure, the method comprising:
  sensing a position or movement of a portion or region of the moving conveyor belt, and
  based on at least the sensed position or movement of the moving conveyor belt, initiating or not initiating an adjustment or modification to a position, alignment, or orientation of a portion or region of the tracking frame assembly by adjustment of the tracking frame assembly by way of an actuator assembly provided between the tracking frame assembly and the support structure, the actuator assembly configured operable for selective engagement with a reaction assembly thereby allowing selective urging against the reaction assembly so as to assist in, at least in part, correcting an alignment of the conveyor belt.

* * * * *